(12) United States Patent
Shipton et al.

(10) Patent No.: US 10,750,145 B1
(45) Date of Patent: Aug. 18, 2020

(54) VARIABLE-PITCH LIQUID CRYSTAL DIFFRACTION GRATING

(71) Applicant: Oculus VR, LLC, Menlo Park, CA (US)

(72) Inventors: Erik Shipton, Kenmore, WA (US); Alireza Moheghi, Redmond, WA (US); Giuseppe Calafiore, Redmond, WA (US); Hee Yoon Lee, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 115 days.

(21) Appl. No.: 15/988,472

(22) Filed: May 24, 2018

(51) Int. Cl.
*G02B 27/01* (2006.01)
*H04N 9/43* (2006.01)
*G02F 1/1334* (2006.01)
*H04N 9/31* (2006.01)
*G02F 1/29* (2006.01)

(52) U.S. Cl.
CPC ............ *H04N 9/43* (2013.01); *G02F 1/1334* (2013.01); *G02F 1/292* (2013.01); *H04N 9/3105* (2013.01); *H04N 9/3114* (2013.01); *G02B 2027/015* (2013.01); *G02B 2027/0116* (2013.01); *G02B 2027/0134* (2013.01); *G02F 2201/305* (2013.01)

(58) Field of Classification Search
None
See application file for complete search history.

(56) References Cited

U.S. PATENT DOCUMENTS

| | | | |
|---|---|---|---|
| 2015/0234477 A1* | 8/2015 | Abovitz | G06F 16/7837 382/103 |
| 2018/0143438 A1* | 5/2018 | Oh | G02B 5/1857 |
| 2018/0275409 A1* | 9/2018 | Gao | H04N 13/332 |
| 2019/0212557 A1* | 7/2019 | Waldern | G02B 6/0026 |
| 2019/0369403 A1* | 12/2019 | Leister | G02B 26/0808 |

* cited by examiner

*Primary Examiner* — Jessica M Merlin
*Assistant Examiner* — Mark D Teets
(74) *Attorney, Agent, or Firm* — FisherBroyles, LLP

(57) ABSTRACT

An apparatus may include a projector that switches from emitting monochromatic light of a first color to emitting monochromatic light of a second color that is different from the first color. The apparatus may also include one or more variable-pitch diffraction gratings that diffract monochromatic light emitted from the projector. The apparatus may further include a controller that changes a pitch of at least one of the one or more variable-pitch diffraction gratings from a first pitch used when the projector is emitting monochromatic light of the first color to a second pitch used when the projector is emitting monochromatic light of the second color.

20 Claims, 19 Drawing Sheets

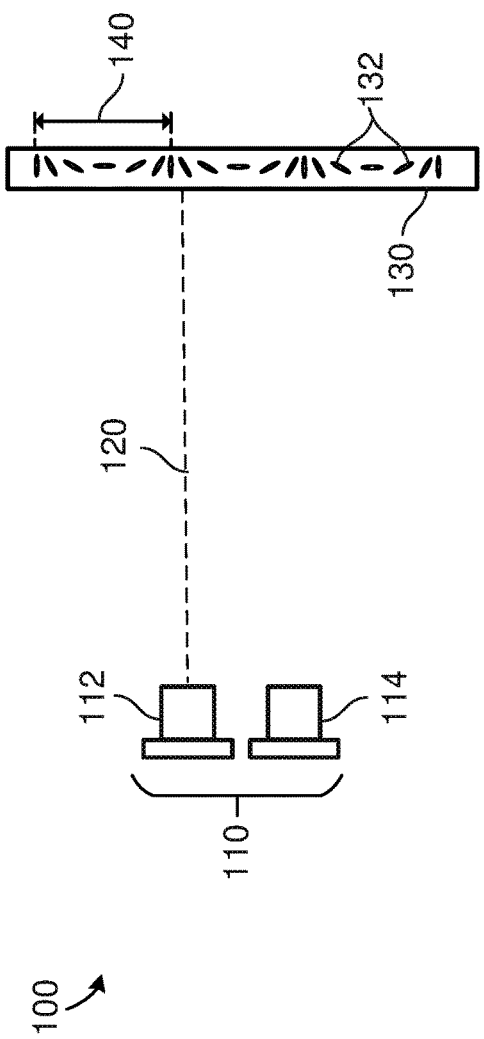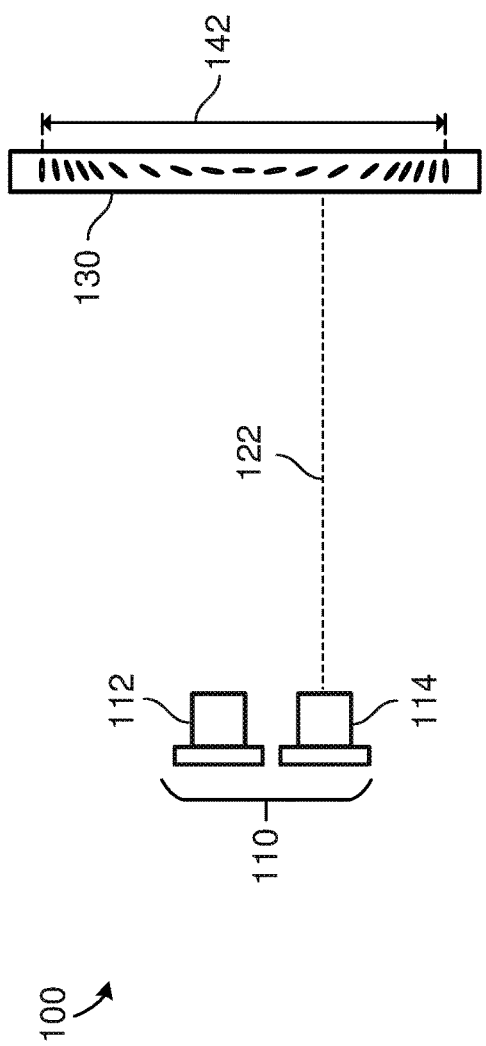

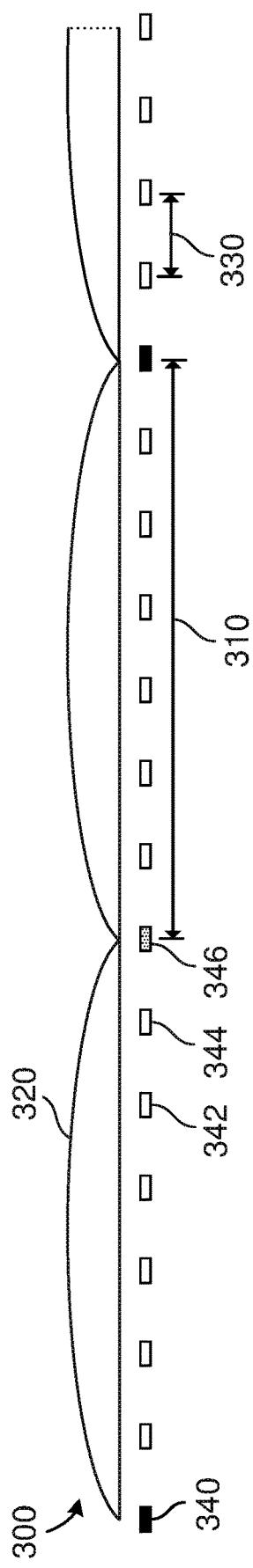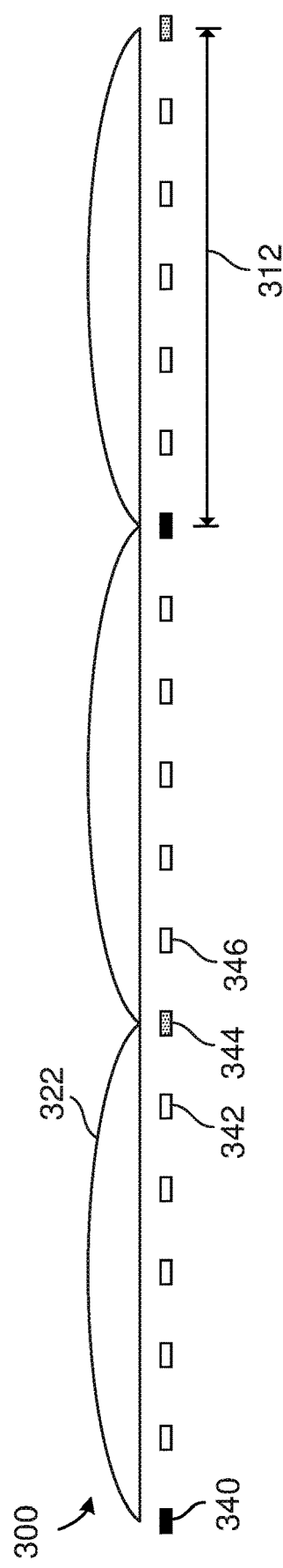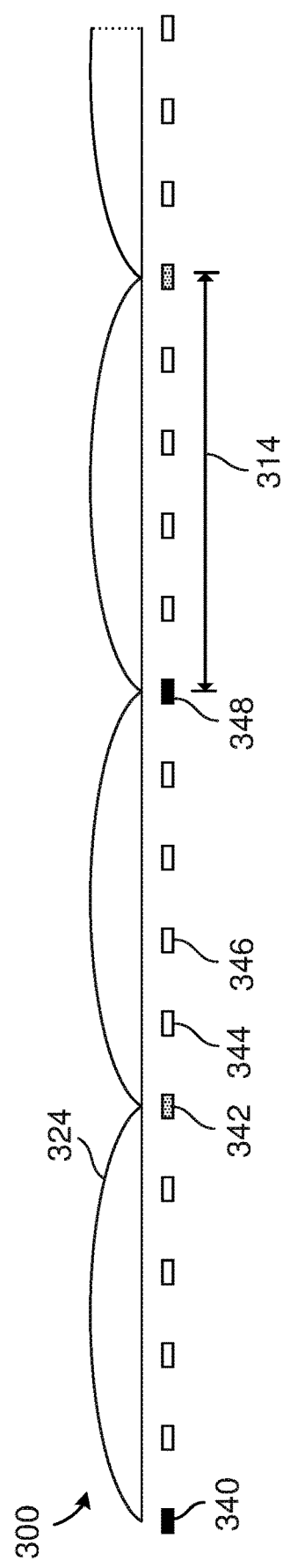

VARIABLE-PITCH LIQUID CRYSTAL DIFFRACTION GRATING

BACKGROUND

This disclosure relates generally to diffraction gratings.

Traditional diffraction gratings typically have a fixed pitch, which may be undesirable in certain situations. For example, in waveguides used for color multiplexing, a diffraction coupling or decoupling element may refract light having different wavelengths at different angles. These differences in refracted angles may result in optical artifacts and aberrations. What is needed, therefore, are improved systems and methods for diffracting different wavelengths of light.

SUMMARY

As will be described in greater detail below, the instant disclosure describes an apparatus having one or more projectors that may project different colors of monochromatic light, one or more variable-pitch diffraction gratings whose pitch may be changed from a pitch suitable for a first color to a pitch suitable for a second color, and a controller that can change the pitch of the one or more diffraction gratings with appropriate timing.

At least one embodiment may include an apparatus that may have a projector that switches from emitting monochromatic light of a first color to emitting monochromatic light of a second color that is different from the first color. The apparatus may further include one or more variable-pitch diffraction gratings that diffract monochromatic light emitted from the projector. The apparatus may also include a controller that changes a pitch of at least one of the one or more variable-pitch diffraction gratings from a first pitch used when the projector is emitting monochromatic light of the first color to a second pitch used when the projector is emitting monochromatic light of the second color.

In one example, the one or more variable-pitch diffraction gratings may include a coupling diffraction grating that receives monochromatic light from the projector and a decoupling diffraction grating that receives diffracted light from the coupling diffraction grating. In such embodiments, the controller may change the pitches of the coupling and decoupling diffraction gratings in tandem. The controller may change the pitch by changing an electric field applied to the one or more variable-pitch diffraction gratings. In an example, before being changed, the electric field may cause liquid crystal molecules in the one or more variable-pitch diffraction gratings to align in a configuration having a first periodic refractive index profile. After being changed, the electric field may cause the liquid crystal molecules in the one or more variable-pitch diffraction gratings to align in a configuration having a second periodic refractive index profile. Moreover, before being changed, the electric field may be generated by applying an electric voltage to a first pattern of electrodes in the one or more variable-pitch diffraction gratings, and after being changed, the electric field may be generated by applying an electric voltage to a second pattern of electrodes in the one or more variable-pitch diffraction gratings.

In at least one embodiment, the projector may further switch from emitting monochromatic light of the second color to emitting monochromatic light of a third color that is different from the first color and the second color. The controller may change the pitch of at least one of the one or more variable-pitch diffraction gratings. The controller may change the pitch from the second pitch that is used when the projector is emitting the monochromatic light of the second color to a third pitch used when the projector is emitting the monochromatic light of the third color. In one example, the one or more variable-pitch diffraction gratings may include one or more high-birefringence liquid crystal diffraction gratings and/or chiral dopants. The projector may be controlled to delay emitting monochromatic light of the second color until the pitch of the variable-pitch diffraction gratings have been changed to the second pitch.

In one embodiment, the apparatus may include a waveguide, and the projector may emit monochromatic images into the waveguide. In an example, the projector may switch between emitting monochromatic images of the first color, emitting monochromatic images of the second color, and emitting monochromatic images of a third color that is different from the first and second colors. The waveguide may include the one or more variable-pitch diffraction gratings that diffract the monochromatic light emitted from the projector. The controller may change the pitch of at least one of the one or more variable-pitch diffraction gratings from the first pitch used when the projector is emitting monochromatic light of the first color to the second pitch used when the projector is emitting monochromatic light of the second color and further, to a third pitch used when the projector is emitting monochromatic light of the third color. The first, second, and third colors may be red, green, and/or blue, although not necessarily in that order.

In some embodiments, the apparatus may include a head-worn frame, and a waveguide may be attached to the head-worn frame so that when the head-worn frame is donned by a user, the waveguide is viewable by the user. A decoupling grating of the one or more variable-pitch diffraction gratings may emit monochromatic light of the first, second, and third colors in sequence to generate at least one polychromatic pupil replication that at least partially defines a viewing eyebox.

At least one embodiment is a method that may include directing a projector to switch from emitting monochromatic light of a first color to emitting monochromatic light of a second color that is different from the first color. The method may also include controlling a change in a pitch of at least one of one or more variable-pitch diffraction gratings that diffract the monochromatic light emitted from the projector from a first pitch that may be used when the projector is emitting the monochromatic light of the first color to a second pitch that may be used when the projector is emitting the monochromatic light of the second color. In one example, the one or more variable-pitch diffraction gratings may include two variable-pitch diffraction gratings that have the same pitch, and the pitch of the two variable-pitch diffraction gratings that have the same pitch may be changed in tandem. The pitch may be changed by changing an electric field applied to the one or more diffraction gratings. In an example, before being changed, the electric field may cause liquid crystal molecules in the one or more variable-pitch diffraction gratings to align in a configuration having a first periodic refractive index profile. After being changed, the electric field may cause the liquid crystal molecules in the one or more variable-pitch diffraction gratings to align in a configuration having a second periodic refractive index profile. In at least one example, the projector may be controlled to emit monochromatic light of the second color after the pitch has been changed from the first pitch to the second pitch. Moreover, in one example, the method may include directing the projector to switch from emitting monochromatic light of the second color to emitting monochromatic light of a third color that is different from the first color and the second color. The method may further include controlling an additional change in the pitch of the at least one of one or more variable-pitch diffraction gratings from the second pitch used when the projector is emitting the monochromatic light of the second color to a third pitch used when the projector is emitting the monochromatic light of the third color. In one example, the one or more variable-pitch diffraction gratings may include one or more liquid crystal gratings having high birefringence and/or chiral dopants.

Another embodiment may include a computer-readable medium storing computer-readable instructions that, when executed by at least one processor of a computing device, may cause the computing device to (1) direct a projector to switch from emitting monochromatic light of a first color to emitting monochromatic light of a second color that is different from the first color, and (2) control a change in a pitch of at least one of one or more variable-pitch diffraction gratings that diffract the monochromatic light emitted from the projector from a first pitch used when the projector is emitting the monochromatic light of the first color to a second pitch used when the projector is emitting the monochromatic light of the second color. In an example, the one or more variable-pitch diffraction gratings may include two variable-pitch diffraction gratings sharing the same pitch, and the pitches of the two variable-pitch diffraction gratings that share the same pitch may be changed in tandem. In another example, the computer-readable instructions may be programmed to control the change in the pitch by changing an electric field applied to the one or more diffraction gratings.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 1A and 1B depict an exemplary optical system having a projector that switches from emitting monochromatic light from a first emitter to emitting monochromatic light from a second emitter.

FIGS. 3A-3C depict exemplary refractive index profiles for a diffraction grating configured for use with red, green, and blue emitters.

Figure 2A:
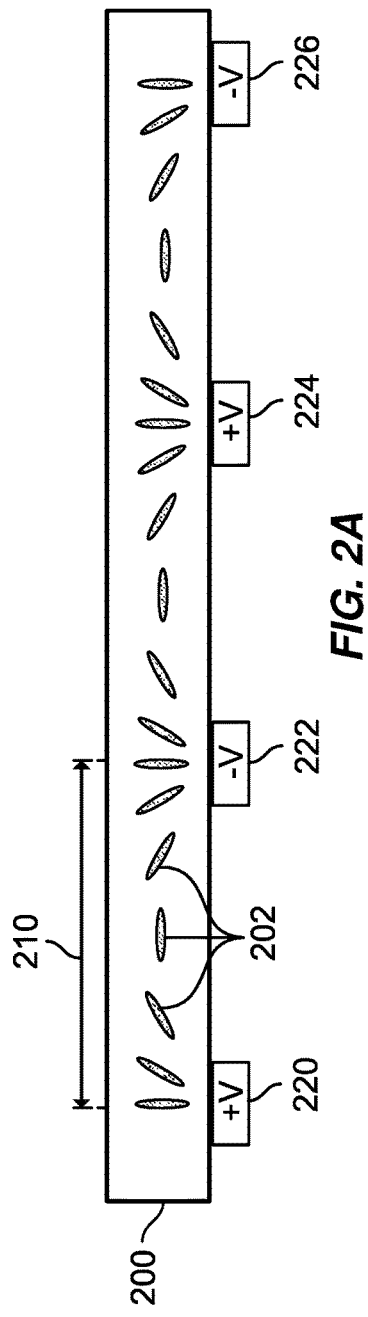
FIGS. 2A-2C depict exemplary cross-sectional views of a liquid-crystal diffraction grating and how liquid crystal molecules form different patterns depending on applied electric fields.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to changing the pitch of a liquid crystal diffraction grating based on a color of light being transmitted through the diffraction grating. Certain liquid crystals may have properties that allow for their use as switchable diffraction gratings. For example, a layer of liquid crystals may form molecular orientation patterns under an applied electric field. Thus, if the applied electric field is a periodic electric field, the liquid crystal molecules may follow the pattern of the electric field and have the same periodic structure as the electric field pattern. The refractive index of the liquid crystal molecules may change from minimum to maximum in one pitch. These patterns may function as a diffraction grating. Changing the applied electric field may change the molecular orientation and, as a result, the refractive index profile.

Embodiments of the present disclosure may leverage these properties of liquid crystals to provide variable-pitch diffraction gratings for waveguides and other optical systems. For example, a waveguide configured with variable-pitch input and/or output couplings may provide temporal multiplexing of different wavelengths of light. In this example, a multi-monochromatic projector may emit light into an input coupling of a waveguide, and the waveguide may transmit the light through an output coupling towards a user's eyes. As the projector switches from emitting monochromatic light of a first color to emitting monochromatic light of a second color, a controller may change the pitch of the coupling and decoupling gratings to a pitch dimensioned for the next color to be transmitted. By changing the pitch of a diffraction grating in tandem with the color-switching of a light source, embodiments of the present disclosure may provide a number of features and advantages over traditional systems.

One example of a system that may benefit from variable-pitch diffraction gratings is a head-worn display. Such a system may include a multi-monochromatic projector with red, green, and blue light emitting diodes (LEDs) that emit light, via an input coupling, into a waveguide. The waveguide may then transmit the light to the eyes of the user via an output coupling. However, without compensation, the light may exhibit lateral chromatic aberrations. The lateral chromatic aberrations may be a result of the index of refraction of the input and/or output coupling of the waveguide varying as a function of the wavelength of light. These chromatic aberrations may involve dispersion effects that may be perceived by a user as color fringing or ghosting.

One option for addressing color fringing in head-worn display waveguides may be to provide three separate, stacked waveguides, with each waveguide having different diffraction gratings configured to transmit monochromatic images of a particular color. Each separate waveguide may include input and output couplings with pitches that correspond to the color of light passing through the waveguide. The gratings may be configured such that the light exiting each waveguide is aligned along a common axis, thereby reducing or eliminating chromatic aberrations, such as color fringing. However, since such waveguides may be made from high-density and/or bulky materials, using three waveguides may make it difficult to meet weight and/or size requirements for some use cases (e.g., mobile displays and/or head-mounted displays).

Certain embodiments of this disclosure may address possible drawbacks of other solutions by providing a single waveguide with variable-pitch gratings that can switch in response to an applied voltage. To address the different angles at which various colors of light may be refracted via input and/or output couplings, a display system may include a projector that switches from projecting one color to projecting another color, such that only a single color is transmitted via the waveguide at a time. The display system may also change a pitch of the input and/or output couplings to correspond to the color being transmitted via the waveguide. Thus, the systems and methods disclosed herein may enable color multiplexing in a single waveguide while also reducing or eliminating one or more chromatic aberrations, such as color fringing.

In some embodiments, in addition to changing the pitch of a liquid crystal diffraction grating, a display system may control the diffraction efficiency of a liquid crystal diffracting grating by varying the applied voltage as a function of position. Driving a grating at a lower voltage than needed to fully align the liquid crystals may result in a smaller refractive index variation/modulation, which may result in a lower diffraction efficiency. This can be advantageous in certain waveguide-based augmented reality or virtual reality systems to improve image uniformity.

Figure 4:
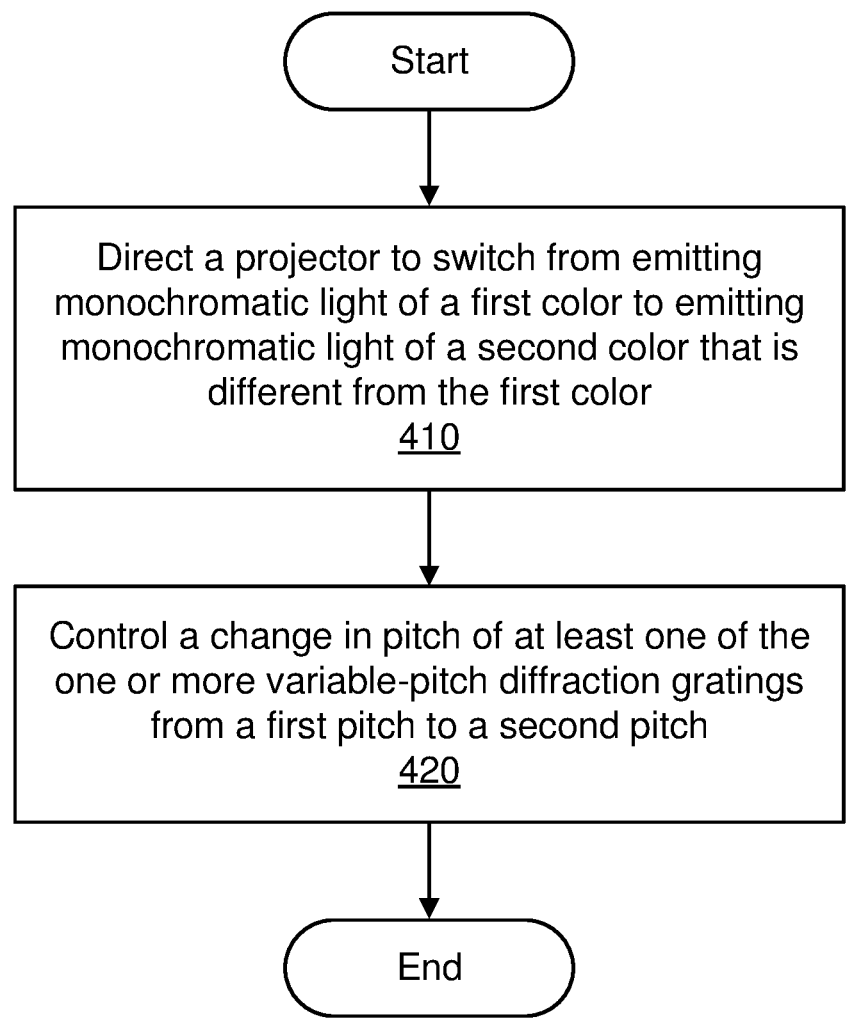
FIG. 4 depicts an exemplary method for coordinating changes to the pitch of a diffraction grating with changes in color emitted by a projector.
Figure 5:
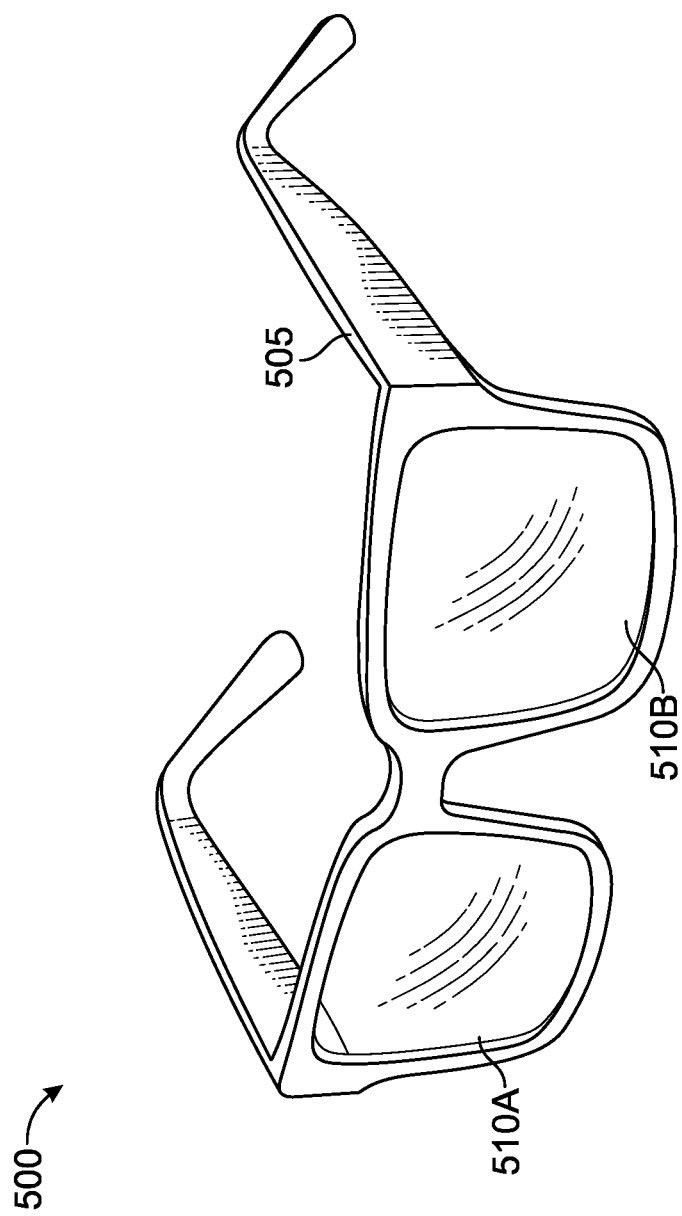
FIG. 5 depicts an exemplary near-eye display that includes waveguides with variable-pitch input and output couplings.
Figure 6:
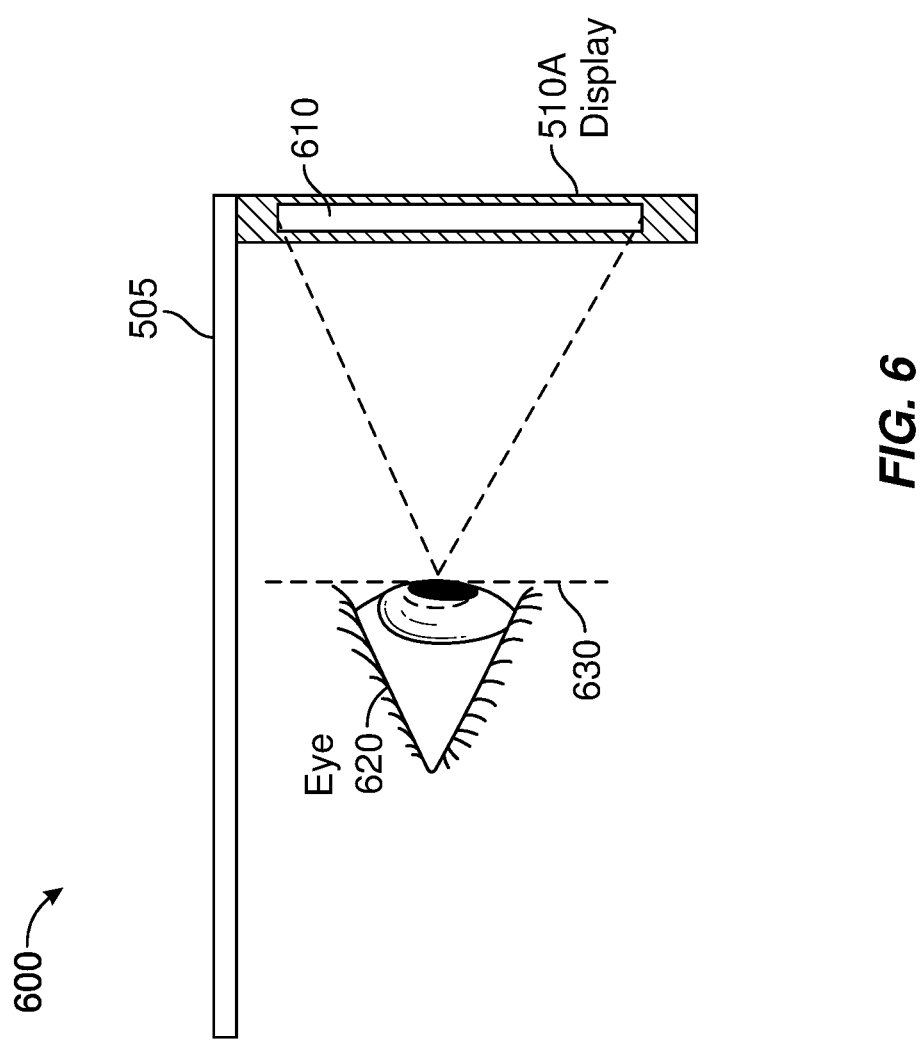
FIG. 6 depicts a cross-sectional view of the near-eye display illustrated in FIG. 5.
Figure 7:
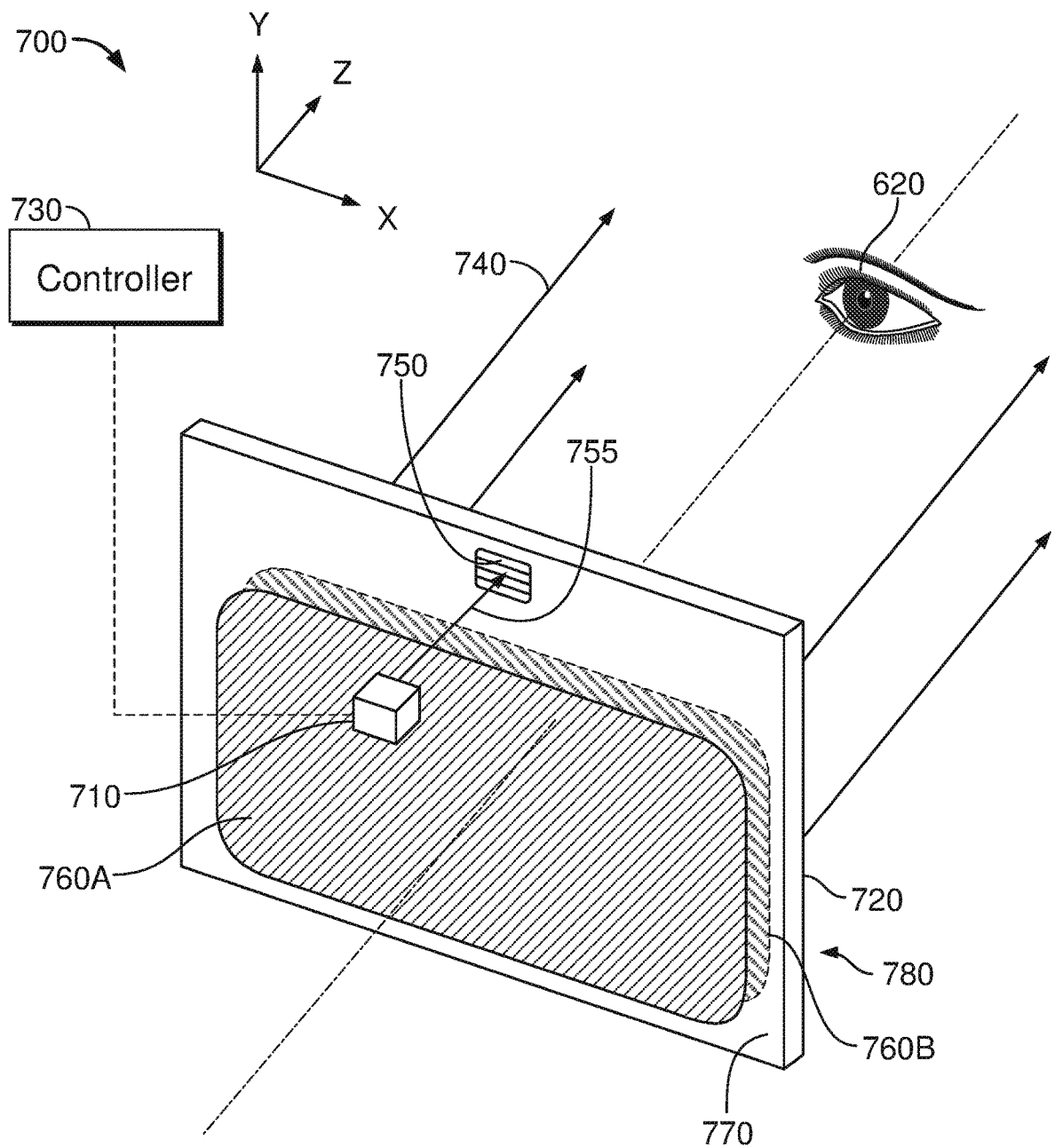
FIG. 7 depicts a cross-sectional view of a near-eye display having a single waveguide configuration.
Figure 12A:
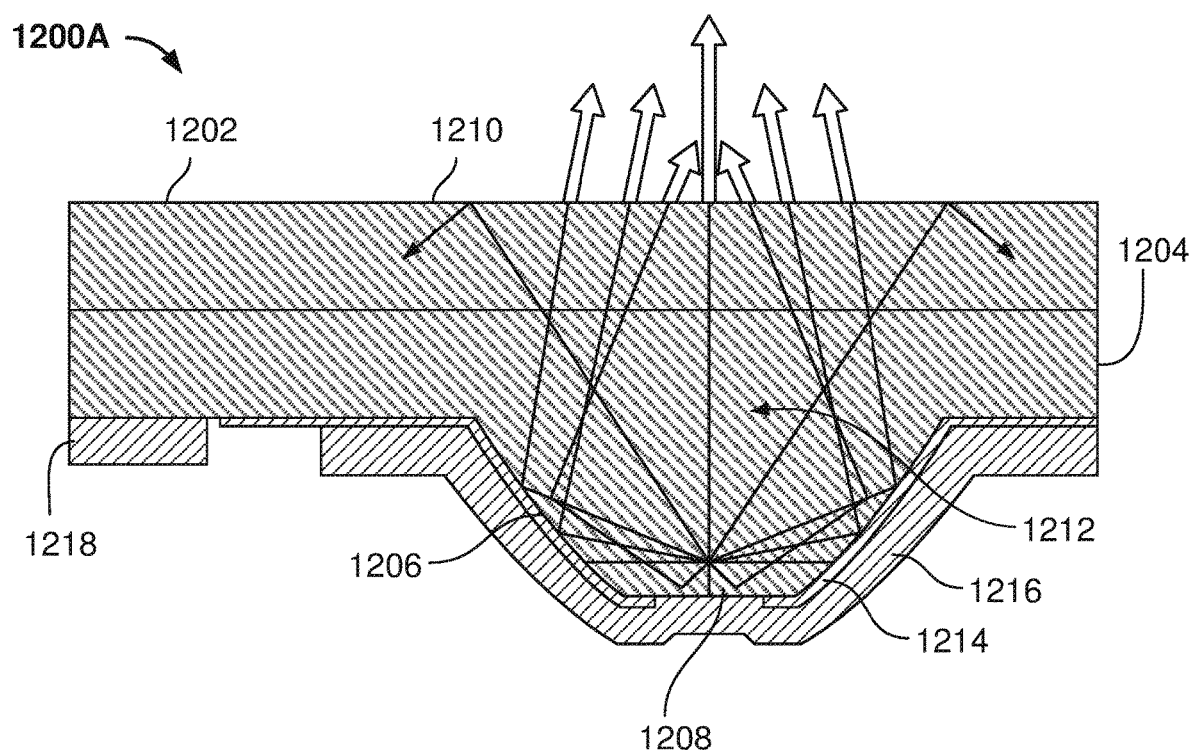
FIGS. 12A and 12B depict cross-sectional views of exemplary micro-LEDs for multi-monochromatic projectors.
Figure 12B:
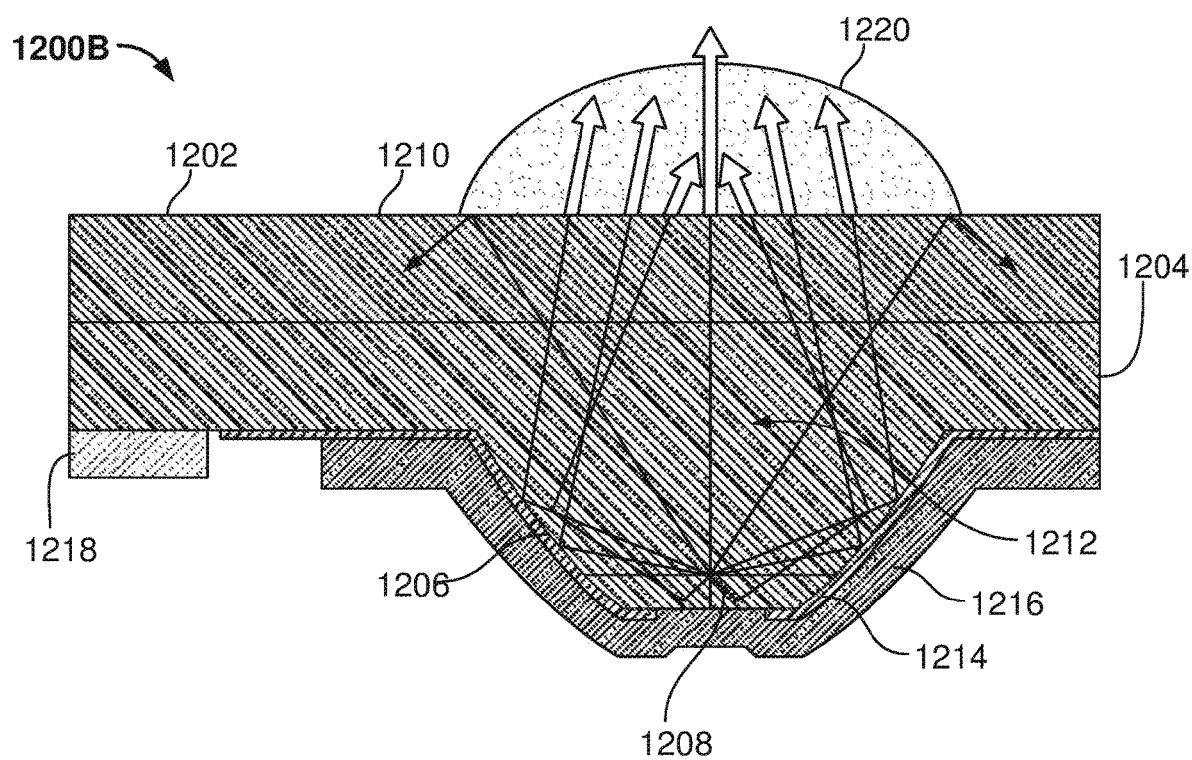
Figure 13A:
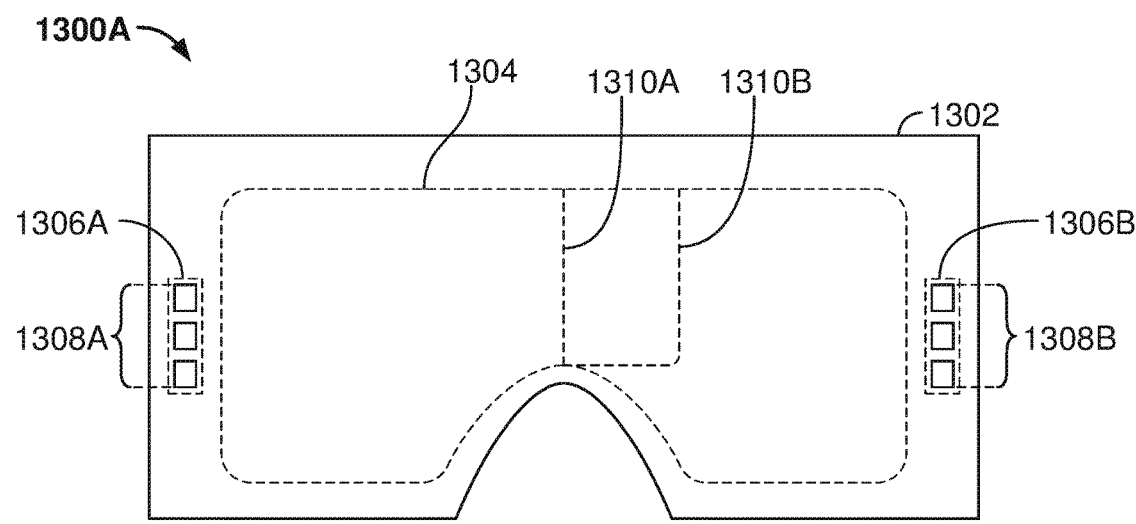
FIGS. 13A and 13B depict exemplary configurations of waveguides and projectors in a near-eye display.
Figure 13B:
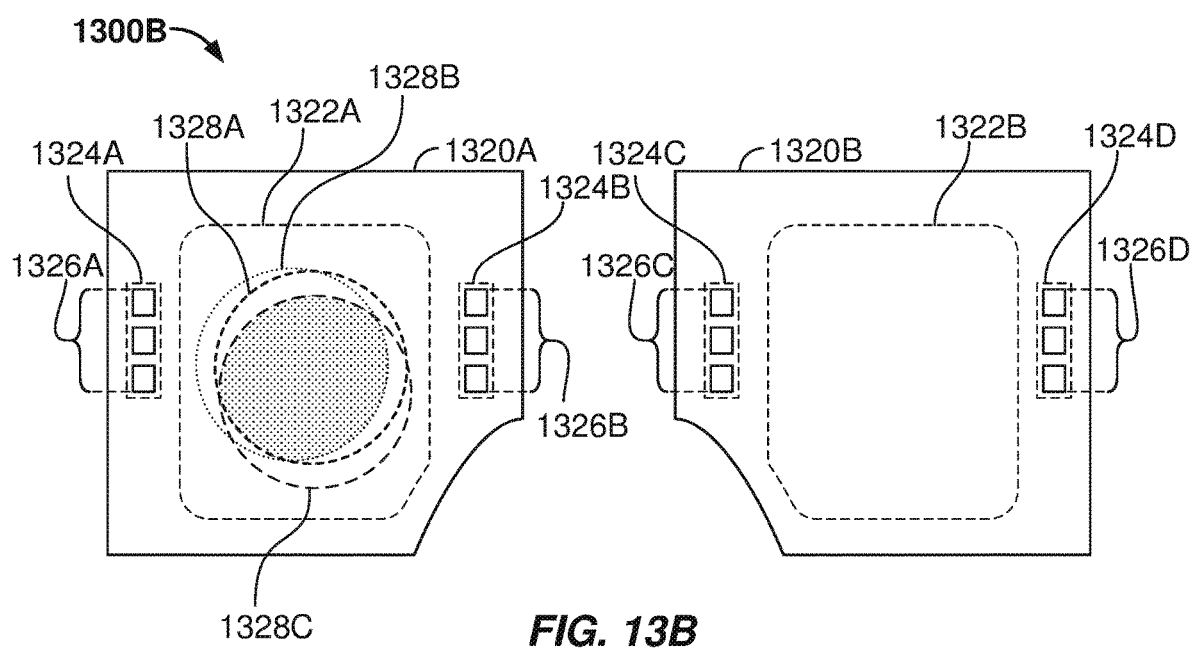

The following will provide, with reference to FIGS. 1-3, a discussion of exemplary variable-phase liquid crystal diffraction grating. The discussion corresponding to FIG. 4 provides examples of coordinating changes to the pitch of a diffraction grating with changes in color emitted by a projector, and the discussion corresponding to FIGS. 5-7 provides an overview of an exemplary near-eye display that includes waveguides with variable-pitch input and output couplings. The following also provides, with respect to FIGS. 8A-8D and 9A-9C, a discussion of exemplary waveguide displays and configurations. Furthermore, the discussion corresponding to FIGS. 10A-10C and 11A-11C provides an explanation of various emitter assemblies and configurations for a multi-monochromatic projector. Finally, the discussion corresponding to FIGS. 12A and 12B is directed to exemplary micro-LEDs for multi-monochromatic projectors, and the discussion corresponding to FIGS. 13A and 13B is directed to exemplary configurations of waveguides and projectors in a near-eye display.

FIGS. 1A and 1B show an optical system 100 having a projector 110 that switches from emitting monochromatic light 120 from a first emitter 112 to emitting monochromatic light 122 from a second emitter 114. In this example, monochromatic light 120 may have a different wavelength than monochromatic light 122. Emitters 112 and 114 may be configured in various ways, as discussed in greater detail in the discussion of FIGS. 10A-10C, 11A-11C, and 12A-12B. As shown in FIG. 1A, monochromatic light 120 from projector 110 may be diffracted by a variable-pitch diffraction grating 130. Variable-pitch diffraction grating 130 may have a pitch 140, which can refer to the distance between two planes in which molecules 132 of diffraction grating 130 have rotated through an angle of 180 degrees. More generally, a pitch of a diffraction grating may, in some embodiments, describe a distance between the periodic structures of the grating.

The liquid-crystal diffraction gratings described herein may generally be any optical component having a periodic or semi-periodic structure that interacts with incident light by diffracting it in multiple directions. The angle at which the incident light is diffracted may depend at least on a pitch of the grating and a wavelength of the incident light, as discussed in greater detail below. Furthermore, the diffraction gratings discussed herein may be reflective, absorptive, and/or transmissive gratings, depending on the use case and/or design requirements of a particular optical system.

Liquid-crystal diffraction gratings may be configured in a variety of ways. For example, diffraction grating 130 may include two transparent or semi-transparent elements (e.g., plates of glass or polymeric materials) with a liquid crystal medium positioned in between. In some examples, the liquid-crystal medium may form a thin film between parallel faces of the two transparent elements. The liquid crystal medium may include nematic-type liquid crystals, such as methoxy-benzilidene-butylaniline (MBBA) and 4-Pentyl-4-cyanobiphenyl (5CB). In another example, the liquid-crystal medium may include cholesteric liquid crystals (e.g., chiral-nematic liquid crystals, such as cholesteryloleyl-carbonate), in which a molecular stack has a twisted, helical structure. The liquid-crystal medium may also include any suitable mixture of nematic liquid crystals, which may have larger, more well-defined dipole moments and relatively high birefringence, and cholesteric-type liquid crystals, which may have smaller dipole moments but may have the advantage of responding more quickly changing electric fields. For example, a layer of nematic liquid crystals may be doped with chiral dopants, which may increase the response time of the nematic liquid crystals.

Nematic liquid crystals may be composed of rod-like molecules that can be characterized by a long axis along the length of the rod-like molecules. In some aspects, the long axes of neighboring molecules of the nematic liquid crystals may be aligned approximately to one another. A dimensionless unit vector, referred to herein as the director, may represent the average direction of the long molecular axes of the molecules in a given region of the liquid crystal. The ability of the director to align along an external field can be due to the electric dipoles of the molecules. Electric dipoles may result when one portion of a molecule has a net positive charge, while the other portion has a net negative charge. Thus, when an external electric or magnetic field is applied to the liquid crystal, the dipole moments of the molecules may tend to orient themselves along the direction of the applied field.

The application of an electric field (e.g., via a potential difference) may orient the dipole moments of liquid crystal molecules in a given volume of a liquid crystal. For example, the application of an electric field to a layer of liquid crystals may either cause the formation of a molecular orientation pattern of the liquid crystals (e.g., for nematic liquid crystals) or may modify an existing orientation pattern of the liquid crystals (e.g., for cholesteric liquid crystals). The dipole moment of the liquid crystals may be either parallel or perpendicular to the long axis of the molecules. In some aspects, nonlinear interactions (for example, self-action effects, wave-mixing, and switching phenomena resulting in part from nonlinear index of refraction coefficients of the liquid crystals) may form or change the orientation pattern—and therefore the pitch—of a liquid-crystal, and may therefore be leveraged to change the efficiency of a diffraction pattern.

Diffraction efficiency can refer to aspects of the performance of the diffraction grating in terms of power throughput of the diffraction grating. In particular, the diffraction efficiency can be a measure of the optical power diffracted into a given direction compared to the power incident onto the diffractive element. The diffraction efficiency can be influenced by the pitch of the grating and/or the reflectivity of the coatings or materials comprising the diffraction grating. In some aspects, the diffraction efficiency can vary significantly with the polarization of incident light. Furthermore, the diffraction efficiency can include an absolute efficiency that can further indicate the diffracted optical power into a particular order of the diffraction grating to the incident power. The diffraction efficiency can also include a relative efficiency that can relate the power diffracted into a particular order to the power that would be reflected by a mirror of the same coating as the grating, therefore attributing to reflection losses at the grating but not caused by inefficient diffraction itself.

In some aspects, driving the applied voltage to the liquid crystal diffraction grating at a lower voltage than required to fully align the director of the liquid crystals may result in a smaller refractive index variation and/or modulation in the liquid crystal, which may result in a lower diffraction efficiency. This lower diffraction efficiency can be advantageous in certain waveguide-based augmented reality systems where variable diffraction efficiency can be used to improve image uniformity. For example, the refracted light at a first angle (corresponding to a first order) from the lower efficiency diffraction grating may not be refracted at a substantially different diffraction efficiency as the refracted light at a second angle (corresponding to a second order); therefore, the refracted light at the first angle may have a similar optical power as the refracted light at the second angle, leading to improved image uniformity.

Returning to the discussion of FIG. 1B, optical system 100 may deactivate emitter 112 and activate emitter 114 at substantially the same time, causing light 122 to be transmitted toward diffraction grating 130. Optical system 100 may also change a pitch of diffraction grating 130 to correspond to light emitted from emitter 114. In one embodiment, optical system 100 may change the pitch of diffraction grating 130 from pitch 140 to pitch 142 at any suitable time. For example, optical system 100 may change the pitch of diffraction grating 130 simultaneously or nearly simultaneously with the activation of emitter 114. In another example, optical system 100 may delay activating emitter 114, for example, until the pitch of diffraction grating 130 has been changed from pitch 140 to pitch 142.

Figure 2B:
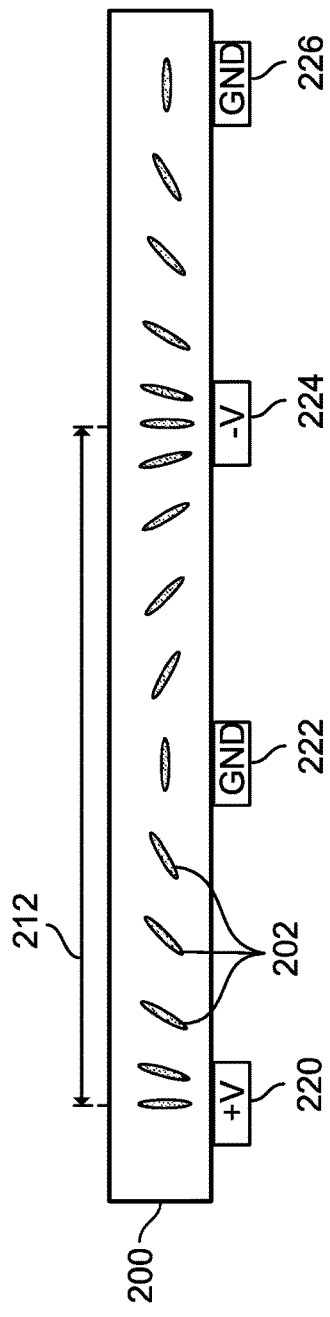
Figure 2C:
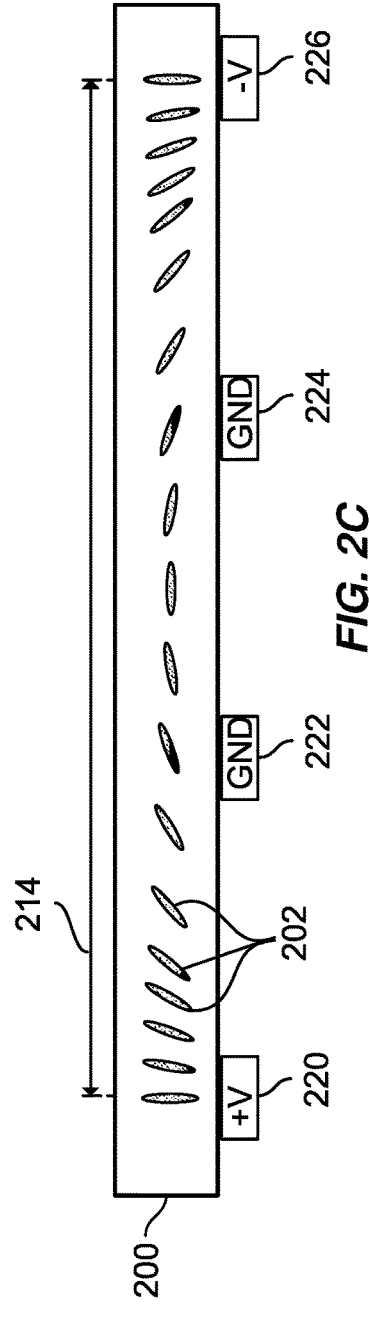

FIGS. 2A-2C show an example of how the pitch of a liquid-crystal diffraction grating may be changed by modifying an electric field applied to the diffraction grating. Diffraction grating 200 in FIG. 2 may include liquid crystal molecules 202 and an array of evenly-spaced electrodes 220, 222, 224, and 226. Electrodes 220, 222, 224, 226 may be spaced at a distance 210, which may also be the pitch of diffraction grating 200. In some aspects, alternating positive and negative voltages can be applied to every other electrode, respectively, as shown in FIG. 2A. In the configuration shown in FIG. 2A, the dipole moments of molecules 202 may rotate 180 degrees between electrode 220 and electrode 222, and the dipole moments may rotate a full 360 degrees between electrode 220 and 226.

In some embodiments, electrodes 220, 222, 224, and/or 226 may include metals or conductive materials, including, but not limited to, gold, copper, silver, aluminum, zinc, tin, platinum, titanium, titanium nitride, tantalum nitride, silicide, tungsten, palladium, molybdenum, germanium, ruthenium, nickel any of the like. Electrodes 220, 222, 224, and/or 226 may include any combinations (e.g., alloys) of such materials. In one embodiment, the electrodes 220, 222, 224, and/or 226 may be deposited using any suitable process, for example, physical vapor deposition (PVD), chemical vapor deposition (CVD), atomic layer deposition (ALD), and the like.

As shown in FIG. 2B, the electric field applied to diffraction grating 200 may be changed by applying a positive voltage to electrode 220 and a negative voltage to electrode 224; moreover, electrodes 222 and 226 may be grounded or may be disconnected such that the electrodes 222 and 226 have floating voltages. In this configuration, the pitch of diffraction grating 200 may be 212, which may represent the distance between electrode 220 and electrode 224. Similarly, the pitch of diffraction grating 200 in FIG. 2C may be a distance 214 between electrodes 220 and 226. As shown in FIG. 2C, a positive voltage may be applied to electrode 220, electrodes 222 and 224 may be grounded (or left floating), and a negative voltage may be applied to electrode 226, causing the dipole moments of molecules 202 to rotate 180 degrees between electrode 220 and electrode 226.

Electrodes 220, 222, 224, and 226 may be configured in any suitable manner. For example, in some embodiments, electrodes 220, 222, 224, and 226 may be formed from a thin film of electrically conductive and semi-transparent material, such as indium tin oxide (ITO). Electrode 220, 222, 224, and 226 may be integrated into or attached to an outside of diffraction grating 200.

In some implementations, alternatives to ITO can be used, including wider-spectrum transparent conductive oxides (TCOs), conductive polymers, metal grids, carbon nanotubes (CNT), graphene, nanowire meshes, and thin-metal films. Additional TCOs can include doped binary compounds, such as aluminum-doped zinc-oxide (AZO) and indium-doped cadmium-oxide. Additional TCOs may include barium stannate and metal oxides, such as strontium vanadate and calcium vanadate. In some implementations, conductive polymers can be used. For example, a poly(3,4-ethylenedioxythiophene) PEDOT: poly(styrene sulfonate) PSS layer can be used. In another example, a poly (4,4-dioctyl cyclopentadithiophene) material doped with iodine or 2,3-dichloro-5,6-dicyano-1,4-benzoquinone (DDQ) can be used. The example polymers and similar materials can be spin-coated in some example embodiments.

While FIG. 2 shows one example of how an electric field may be applied to a liquid-crystal diffraction grating, embodiments of the instant disclosure may cover any other suitable alternative or configuration. For example, FIGS. 3A-3C show a different spacing scheme for applying voltage to electrodes of a variable-pitch diffraction grating to create pitch distances corresponding to red, blue, and green light. As illustrated in FIG. 3, a diffraction grating 300 may have a set of electrodes, including electrodes 340, 342, 344, 346, and 348. The set of electrodes may be spaced at a distance 330, which may be approximately 93 nm in one example.

In FIG. 3A, alternating positive and negative voltages may be applied to every seventh electrode in the set of electrodes. For example, a positive voltage may be applied to electrode 340, a negative voltage may be applied to electrode 346, and no voltage may be applied to the electrodes in between electrode 340 and electrode 346, such as electrodes 342 and 344. This scheme may create a pitch 310 and a refractive index profile 320 between the charged electrodes. In the example where distance 330 is approximately 93 nm, pitch 310 may be approximately 651 nm, which may correspond to a wavelength of a red light.

In FIG. 3B, alternating positive and negative voltages may be applied to every sixth electrode in the set of electrodes. For example, a positive voltage may be applied to electrode 340, a negative voltage may be applied to electrode 344, and no voltage may be applied to electrodes in between electrode 340 and electrode 344, such as electrode 342. This scheme may create a pitch 312 and a refractive index profile 322 between the charged electrodes. In the example where distance 330 is approximately 93 nm, pitch 312 may be approximately 558 nm, which may correspond to a wavelength of a green light.

In FIG. 3C, alternating positive and negative voltages may be applied to every fifth electrode in the set of electrodes. For example, a negative voltage may be applied to electrode 342, a positive voltage may be applied to electrode 348, and no voltage may be applied to electrodes in between, such as electrodes 344 and 346. This scheme may create a pitch 314 and a refractive index profile 324 between the charged electrodes. In the example where distance 330 is approximately 93 nm, pitch 312 may be approximately 465 nm, which may correspond to a wavelength of a blue light.

By switching between the configurations shown in 3A-3C, diffraction grating 300 may be able to diffract red, green, and blue light at substantially the same angle of diffraction, which may be referred to as $\theta_m$, where m in an integer that indicates an order of a diffracted beam of light by diffraction grating 300. For normally incident light to a diffraction grating, the diffraction equation indicates that diffracted light may be calculated as follows:

$$\theta_m = \arcsin\left(\frac{m\lambda}{d}\right)$$

In this equation, $\lambda$ represents the wavelength of incident light and d represents the pitch of the diffraction grating. More precisely, polarized light incident on diffraction grating 300 may diffract according to the diffraction grating equation $m\lambda = d(\sin \theta_i + \sin \theta_r)$, where $m = \pm 0, 1, \ldots, k$ and may be referred to as the diffraction order, and $\theta_i$ and $\theta_r$ may refer to the angles of incidence and refraction of the light.

Thus, by implementing aspects of the disclosure shown and described in connection with FIG. 3, a variable-pitch diffraction grating may be configured to diffract red, green, and blue light at approximately the same angle by (i) switching the pitch of the grating to match or approximate a wavelength of red light from a projector when the projector emits red light, (ii) switching the pitch of the grating to match or approximate a wavelength of green light from a projector when the projector emits green light, and (ii) switching the pitch of the grating to match or approximate a wavelength of blue light from a projector when the projector emits blue light.

As a specific example, referencing FIG. 3 with an electrode distance of approximately 93 nm, a red emitter of a projector may have a center wavelength of approximately 651 nm, which may match the pitch 310 of diffraction grating 300. Further, a green emitter of the projector may have a center wavelength of approximately 558 nm, which may match pitch 312 of diffraction grating 300. Moreover, a blue emitter of the projector may have a center wavelength of approximately 465 nm, which may match pitch 314 of diffraction grating 300. In this example, the first order diffraction angle of the red, green, and blue light may each be equal to arcsine(1), which is 90 degrees.

Various different electrode spacing configurations and emitter wavelength configurations may be used to create a variable-phase diffraction grating that aligns refracted red, green, and blue light along a common axis. For example, if blue light is considered to include light having a wavelength range of approximately 450 nm to approximately 495 nm, green light is considered to include light having a wavelength range of approximately 495 nm to approximately 570 nm, and red light is considered to include light having a wavelength of approximately 620 nm to approximately 750 nm, then an electrode spacing ranging from approximately 90 nm to approximately 95 nm may allow for an embodiment where alternating voltage intervals may align red, green, and blue light along a common axis. In other embodiments, a diffraction grating may have electrode spacing less than approximately 90 nm or greater than approximately 95 nm, and a projector may also emit different colors and/or wavelengths of light than those identified above. Furthermore, various other electrode spacing patterns (e.g., chirped patterns or other non-uniform spacing patterns) may also be implemented to provide the systems and devices described herein.

In some embodiments, different magnitudes of positive and negative voltages may be applied to the electrodes discussed herein to create diffraction gratings with different properties. In some embodiments, the positive and negative voltages may be chosen such that an applied electric field exceeds a Fréedericksz transition level of the liquid crystals. The Fréedericksz transition level may refer to, in some embodiments, a phase transition produced in liquid crystals when a sufficiently strong electric or magnetic field is applied to a liquid crystal. Below this transition level, a director associated with the liquid crystal may remain undistorted. As a field value is increased above this threshold, the director may begin to distort (e.g., twist) until the director is aligned with the field. This alignment or partial alignment of the director with the electric field can cause the periodic refractive indices discussed herein.

In some aspects, the diffraction efficiency of a liquid crystal-based diffraction grating may be controlled by applying an electric field that exceeds the Fréedericksz transition level but does not fully align the director of the liquid crystals with the applied electric field. Driving the applied voltage to the liquid crystal diffraction grating at a lower voltage than required to fully align the director of the liquid crystals may result in a smaller refractive index variation and/or modulation in the liquid crystal, which may result in a lower diffraction efficiency, as discussed above.

FIG. 4 shows a method 400 for coordinating changes in projector light color with changes in diffraction grating pitch. The steps shown in FIG. 4 may be performed by any suitable computer-executable code and/or computing system. In one example, each of the steps shown in FIG. 4 may represent an aspect of an algorithm whose structure includes and/or is represented by multiple sub-steps or processes, examples of which will be provided in greater detail below.

At step 410, one or more of the systems described herein may direct a projector to switch from emitting monochromatic light of a first color to emitting monochromatic light of a second color that is different from the first color. For example, a display system may change emission colors by deactivating (e.g., by reducing or removing an applied electric current) a light emitter of the first color and activating (e.g., by applying an electric current) a light emitter of the second color.

At step 420, one or more of the systems described herein may control a change in pitch of a variable-phase diffraction grating to correspond to the switch in colors. In some embodiments, the pitch of a liquid-crystal diffraction grating may be changed by modifying an electric field applied to the diffraction grating, as further shown and described in connection with FIG. 2, above. In another embodiment, a different pitch scheme for applying voltage to electrodes of a variable-pitch diffraction grating can be implemented to create pitch distances corresponding to red, blue, and green light, as shown and described in connection with FIG. 3, above.

For example, when a red image is transmitted through the waveguide, both a coupling grating and a decoupling grating may be tuned to diffract a range of wavelengths corresponding to red light through the waveguide and then out toward the user's eye. Analogous requirements may apply to green and blue images, and any other desired colors. As those skilled in the art will understand, the term "color" is used herein to refer to a range of wavelengths of light.

In some embodiments involving near-eye displays, when a red image is transmitted through the waveguide, both a coupling grating and a decoupling grating may be tuned to allow a range of wavelengths corresponding to red light to be refracted (or reflected, depending on the configuration) through the waveguide and then out of the waveguide toward the user's eye. Analogous changes may be made for green and blue images (and/or any other desired image colors). As those skilled in the art will understand, the term "color" is used in some examples to refer to a range of wavelengths of light.

The change in the pitch of the grating may be triggered at any suitable time. For example, an optical system may trigger the switch in color in tandem with (e.g., in sync with or slightly after), changing the diffraction grating pitch. In some embodiments, an optical system may coordinate the timing of transitions between different states of the projector (e.g., different colors) and different states of the diffraction grating (e.g., different pitches). In some embodiments, the optical system may continuously drive the diffracting grating from one pitch to another. Alternatively, the optical system may allow the diffraction grating to settle, or to partially settle, between pitch changes. For example, the optical system may remove an applied electric field that induces a first pitch in the grating, wait for a period of time, and the apply a different electric field to induce a different pitch in the grating.

FIG. 5 is a perspective view of an exemplary near-eye display device (NED) 500. The term "near-eye display," in some embodiments, generally refers to any type or form of display device or system that is worn on or about a user's face (e.g., near the user's eyes) and displays visual content to the user. The term "near-eye display" may, in some embodiments, be used interchangeably with the term "head-worn display." NEDs may display content in any suitable way, including via a light-emitting display such as, e.g., a liquid crystal display (LCD), liquid-crystal on silicon (LCOS), and/or an array of organic light-emitting diodes (OLEDs). NEDs may display content in one or more media formats. For example, an NED may display video, photos, and/or computer-generated imagery (CGI).

NEDs may provide diverse and distinctive user experiences. Some NEDs may provide artificial-reality experiences (e.g., they may display computer-generated or pre-recorded content), while other NEDs may provide real-world experiences (e.g., they may display live imagery from the physical world). NEDs may also provide any mixture of live and virtual content. For example, virtual content may be projected onto a view of the physical world (e.g., via optical or video see-through), which may result in augmented reality or mixed reality experiences. In this example, the NED may be configured such that a user may see through the NED while, at the same time, the NED is projecting an image. Some NEDs may be incorporated into glasses or visors. Other NEDs may be incorporated into helmets, hats, or other headwear.

As shown in FIG. 5, NED 500 may include a separate left and right display (i.e., a left display device 510A and a right display device 510B. NED 500 may also include a support system that secures display devices 510A and 510B in place on the head of a user. Display devices 510A and 510B may be secured to a user's head using any type or form of support system. For example, display devices 510A and 510B may be secured to a user's head using a frame of eye-wear glasses, such as a frame 505 illustrated in FIG. 5. In additional or alternative examples, display devices 510A and 510B may be secured to a user's head using a hat, helmet, and/or strap assembly. In one example, display devices 510A and 510B may include a waveguide with at least a pair of variable-pitch diffraction gratings, as will be described in greater detail below.

FIG. 6 depicts a cross-section 600 of NED 500 depicted in FIG. 5, in accordance with an embodiment. As shown in FIG. 6, display device 510A may include at least one waveguide display assembly 610. In some embodiments, the term "waveguide display assembly" generally refers to any type or form of physical structure for delivering an image light to a user's eyes by guiding electromagnetic waves in the optical spectrum. In one configuration, the waveguide display assembly 610 may be composed of one or more materials (e.g., plastic, glass, etc.) with one or more refractive indices that effectively minimize the weight and widen a field of view of NED 500. In some embodiments, waveguide display assembly 610 may include a varifocal waveguide display. The term "varifocal waveguide display," in some embodiments, generally refers to any type or form of display that can adjust a focal position of image light emitted from the waveguide display.

In one example, waveguide display assembly 610 may be configured to direct image light to a particular eyebox region of the NED 500. For example, as illustrated in FIG. 6, waveguide display assembly 610 may be configured to direct image light to an exit pupil location 630. In this example, a user wearing the NED 500 may see the image light with his or her eye 620 by placing his or her eye 620 in the exit pupil location 630.

For purposes of illustration, FIG. 6 shows a cross section associated with a single eye (i.e., eye 620) and a single waveguide display assembly (i.e., single waveguide display assembly 610), but in alternative embodiments not shown, an additional waveguide display assembly, which is separate from waveguide display assembly 610 shown in FIG. 6 (e.g., a waveguide assembly within display device 510B), may provide image light to an additional eyebox located at an exit pupil of the other eye of a user.

FIG. 7 illustrates an isometric view of a display system or NED 700, according to some embodiments. In some embodiments, NED 700 may be a component (e.g., waveguide configuration 610) of NED 500. In alternate embodiments, NED 700 may be part of another HMD or other system that uses variable-phase diffraction gratings to align different colors of images at an exit pupil.

NED 700 may include a projector device 710, a waveguide 720, and a controller 730. For purposes of illustration, FIG. 7 shows NED 700 associated with a single eye 620, but in some embodiments another waveguide that is completely separate or partially separate from NED 700 may provide image light to another eye of the user. In a partially separate system, one or more components may be shared between the waveguides for each eye. In some instances, a single waveguide 720 may provide image light to both eyes of the user.

Projector device 710 may generate light including one or more two-dimensional monochromatic images. Projector device 710 may include one or more monochromatic optical sources and an optics system, as is further described herein with regard to FIGS. 10A-10C, 11A-11C, and 12A-12B. Projector device 710 may generate and project image light 755, including at least one two-dimensional image, to a coupling area 750 located on a top surface 770 of waveguide 720. Image light 755 may propagate along a dimension or axis toward coupling area 750, which may be a variable-phase diffraction grating, a fixed diffraction grating, a holographic grating, one or more cascaded reflectors, one or more prismatic surface elements, an array of holographic reflectors, etc.

Waveguide 720 may be an optical waveguide that outputs two-dimensional images in image light directed eye 620. Waveguide 720 may receive image light 755 at a coupling area 750, which may include one or more variable-phase coupling elements located on top surface 770 and/or within the body of waveguide 720, and may guide the received image light 755 to a propagation area of waveguide 720. In some configurations, each of the coupling elements in coupling area 750 may have substantially the same area along the X-axis and the Y-axis dimensions and may be separated by a distance along the Z-axis (e.g., on top surface 770 and bottom surface 780, both on top surface 770 but separated by an interfacial layer, both on bottom surface 780 and separated with an interfacial layer, or both embedded into the body of waveguide 720 but separated with the interfacial layer). Coupling area 750 may be understood as extending from the top surface 770 to the bottom surface 780. Coupling area 750 may redirect received image light, according to a first grating vector, into a propagation area of waveguide 720 formed in the body of waveguide 720 between decoupling elements.

A decoupling element 760A may redirect the totally internally reflected image light from the waveguide 720 such that it may be decoupled through decoupling element 760B. Decoupling element 760A may be part of, affixed to, or formed in, the top surface 770 of waveguide 720. Decoupling element 760B may be part of, affixed to, or formed in bottom surface 780 of waveguide 720, such that decoupling element 760A is opposed to decoupling element 760B with a propagation area extending therebetween. In some configurations, there may be an offset between the opposed decoupling elements. For example, the offset can be one quarter of the width of an opposed element. Decoupling elements 760A and 760B may be, e.g., a variable-phase diffraction grating, a fixed diffraction grating, a holographic grating, one or more cascaded reflectors, one or more prismatic surface elements, an array of holographic reflectors, etc.

In some embodiments, each of decoupling elements 760A may have substantially the same area along the X-axis and the Y-axis dimensions and may be separated by a distance along the Z-axis (e.g., on top surface 770 and bottom surface 780, both on top surface 770 but separated by an interfacial layer, both on bottom surface 780 and separated with an interfacial layer, or both embedded into the body of waveguide 720 but separated with the interfacial layer).

An orientation and position of image light 740 exiting waveguide 720 may be controlled by changing an orientation and position of the image light 755 entering coupling area 750. The pitch of decoupling element 760A and/or decoupling element 760B may be variable between approximately 300 nm to approximately 600 nm. In some configurations, coupling area 750 may couple the image light into waveguide 720 and the image light may propagate along the plane of the waveguide 720. Decoupling element 760A may receive image light from coupling area 750 covering a first portion of the first angular range emitted by projector device 710 and may diffract the received image light to another dimension. Decoupling element 760B may diffract a monochromatic, two-dimensional expanded image toward the eyebox.

Coupling area 750 and a decoupling area defined by decoupling element 760A and decoupling element 760B may be designed such that a sum of their respective grating vectors for a particular pitch is less than a threshold value, which may be close to or equal to zero such that light exits waveguide 720 at approximately the same angle at which it enters. Accordingly, image light 755 entering waveguide 720 may be propagated in the same direction when it is output as image light 740 from waveguide 720. Image light 740 may include multiple pupil replications or copies of input image light 755. The location of coupling area 750 relative to decoupling elements 760A and 760B as shown in FIG. 3 is only an example. In other embodiments, the location of coupling area 750 could be on any other portion of the waveguide 720 (e.g., a top edge of top surface 770 or a bottom edge of top surface 770). In some embodiments, NED 700 may include a plurality of projector devices 710 and/or a plurality of coupling areas 750 to increase the FOV and/or eyebox further.

Waveguide 720 may include a waveguide body with top surface 770 and bottom surface 780, extending in X- and Y-directions, that are opposite to each other. Waveguide 720 may be composed of one or more materials that facilitate total internal reflection of image light 755. For example, waveguide 720 may be composed of, e.g., silicon, plastic, glass, or polymers, or some combination thereof. Waveguide 720 can include a dielectric, such as silicon oxide, hafnium oxide, tantalum oxide, titanium oxide, aluminum oxide, silicon dioxide, silicon nitride, and the like. An optical coating may be used in connection with waveguide 720. The optical coating may be a dielectric coating that can include thin layers of materials such as magnesium fluoride, calcium fluoride, and various metal oxides. By choice of the composition, thickness, and number of these layers, the reflectivity and transmissivity of the coating can be tuned.

Waveguide 720 may have a relatively small form factor. For example, waveguide 720 may be approximately 50 mm wide along the X-dimension, 30 mm long along the Y-dimension, and 0.3-1 mm thick along the Z-dimension. In other embodiments, waveguide 720 may be approximately 150 mm wide along the X-dimension and 100 mm long along the Y-dimension, with a thickness ranging between 0.1-0.3 mm along the Z-dimension.

In some embodiments, one or more controllers, such as controller 730, may control the operations of projector device 710. Controller 730 may generate display instructions for projector device 710. The display instructions may include instructions to project or emit one or more monochromatic images. In some embodiments, display instructions may include a monochromatic image file (e.g., a bitmap). The display instructions may also include instructions to change a pitch of one or more variable-phase diffraction gratings. As described herein, the display instructions may further include instructions for moving projector device 710, or individual emitter arrays thereof, or for moving waveguide 720 by activating an actuation system. The display instructions may be received from, e.g., a processing device included in NED 500 of FIG. 5 or in wireless or wired communication therewith. Controller 730 may include a combination of hardware, software, and/or firmware not explicitly shown herein so as not to obscure other aspects of the disclosure.

In some embodiments, waveguide 720 may output expanded image light 740 to user's eye 620 with a relatively large FOV. For example, expanded image light 740 may be transmitted to user's eye 620 with a diagonal FOV (in X- and Y-directions) of at least 100 degrees. Waveguide 720 may be configured to provide an eyebox with a length of at least 20 mm and a width of at least 10 mm, in X- and Y-directions, respectively. Generally, the horizontal FOV may be larger than the vertical FOV. For example, waveguide 720 may have an aspect ratio of 16:9.

Figure 8A:
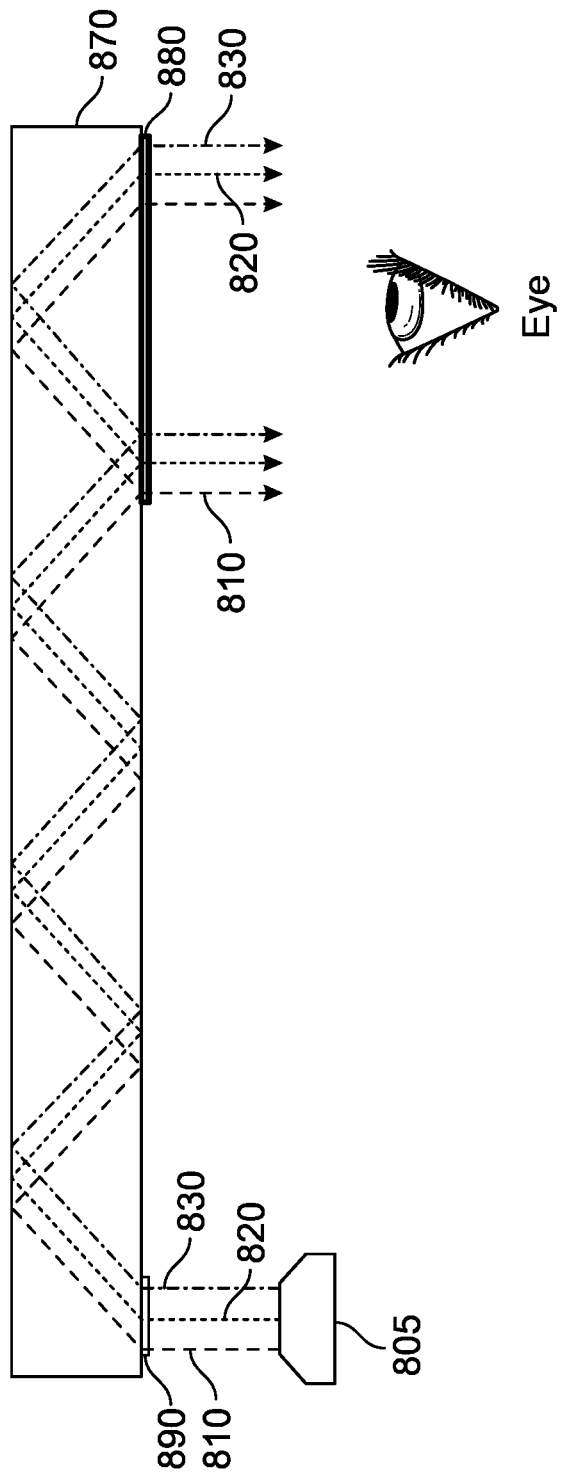
FIGS. 8A-8D depict cross-sectional views of an exemplary waveguide display transmitting light from a projector.
Figure 8B:
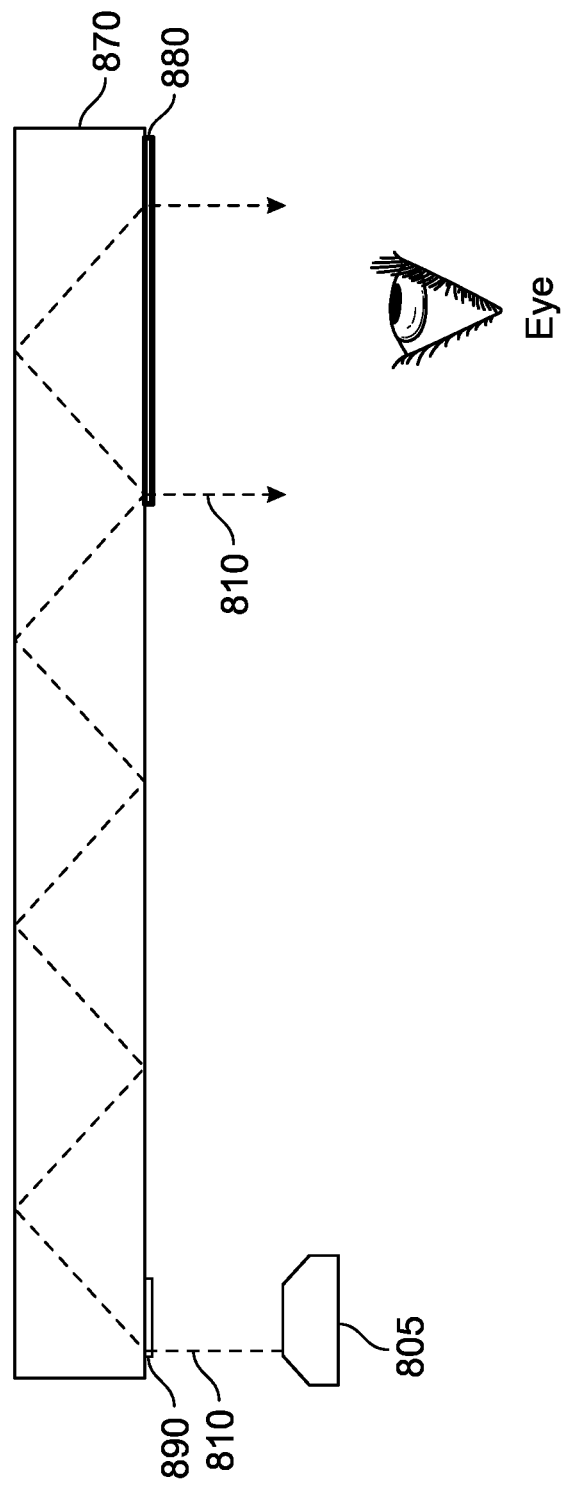
Figure 8C:
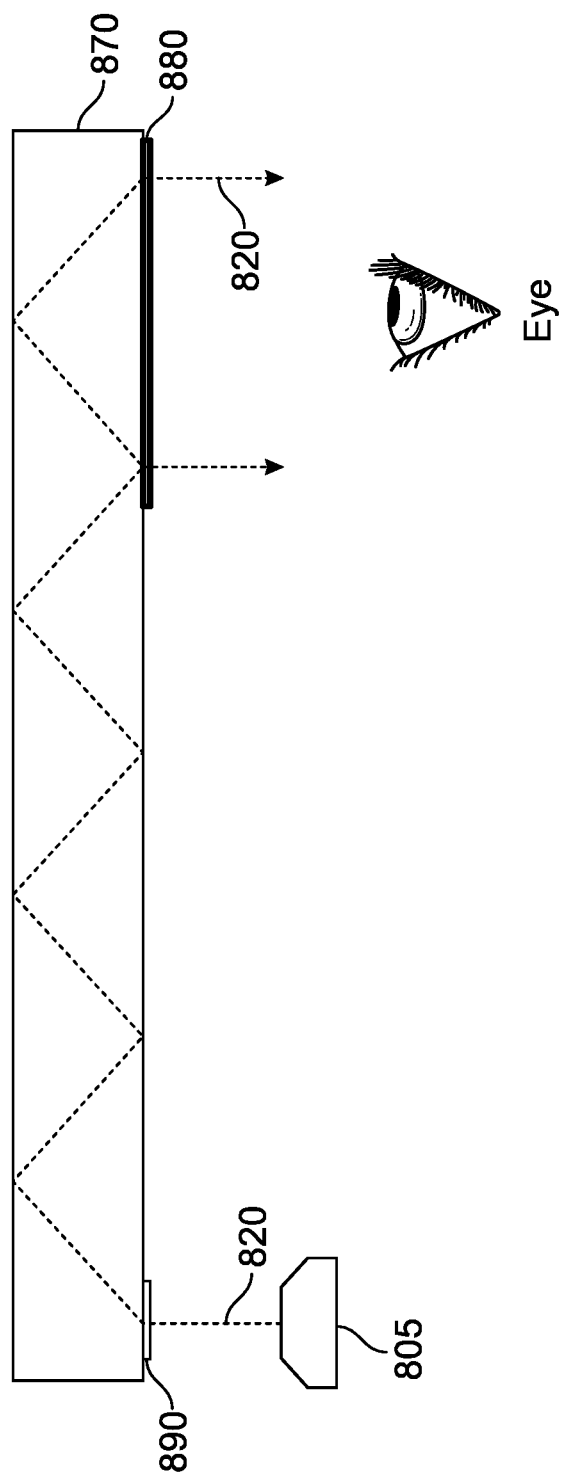
Figure 8D:
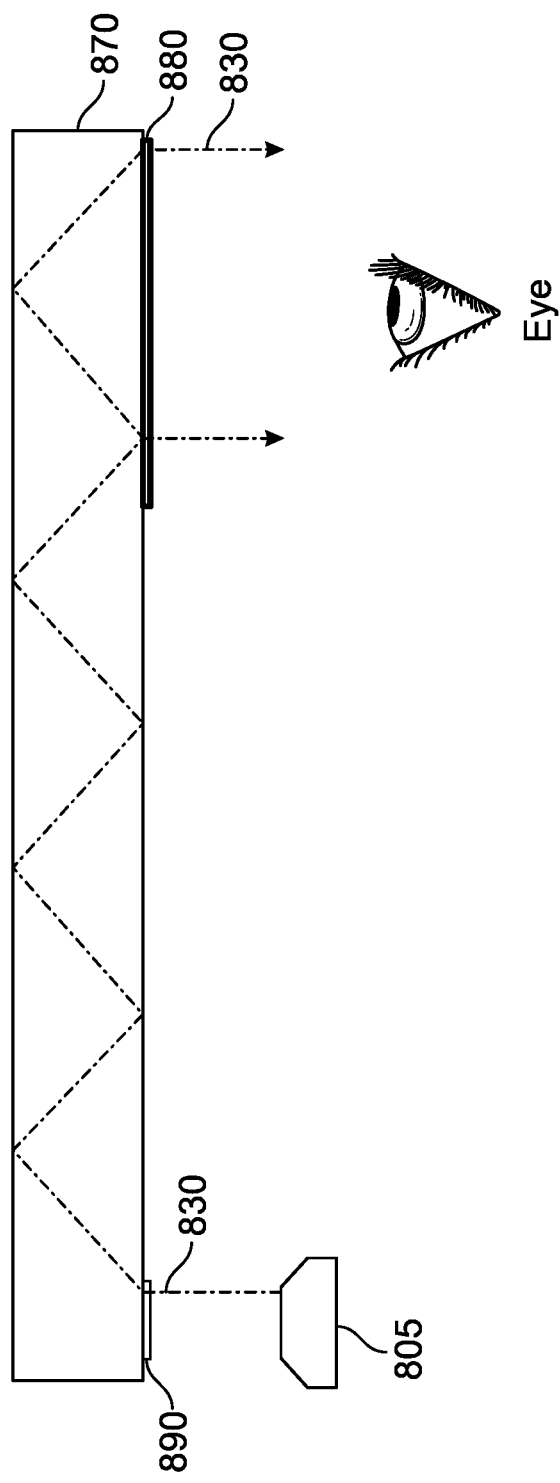

FIGS. 8A-8D depict a waveguide 870 of an embodiment. Emitter 805 (e.g., a projector) may emit monochromatic images (red 810, green 820, and blue 830). In an embodiment, red, green, and blue images may be emitted in sequence, as illustrated in FIGS. 8B-8D, at a rate at which the viewer perceives the three monochromatic images as a single polychromatic image. For example, for a refresh rate of 30 Hz, a projector may switch among red, green, and blue images at a rate of 90 Hz. Embodiments of the present disclosure may also be used with any other suitable refresh rate, including 24 Hz, 60 Hz, 120 Hz, etc.

In FIGS. 8A-8D, coupling area 890 may receive monochromatic light emitted from emitter 805. In the depicted example, red light 810, green light 820, and blue light 830 may be emitted sequentially from emitter 805 into waveguide 870. All three colors may be sequentially refracted into waveguide 870 by coupling area 890, which may switch pitches for each color such that coupling area 890 refracts the light at the same angle for each color (e.g., an angle that causes total internal reflection of the light in waveguide 870 until it reaches decoupling area 880). Decoupling area 880 may then refract the light out of waveguide 870 toward the user's eye, and decoupling area 880 may switch pitches in tandem with coupling area 890.

While some embodiments configure coupling area 890 and decoupling area 880 to refract light at the same angle, other embodiments have coupling and decoupling areas with different indices of refraction. For example, in some embodiments coupling area 890 may be a fixed diffractive element and decoupling area 880 may be a variable-pitch diffraction grating that compensates for chromatic aberrations of both the coupling and decoupling areas. In other embodiments, decoupling area 880 may be a fixed diffraction grating and coupling area 890 may be a variable-pitch diffraction grating that may compensate for chromatic aberrations of both the coupling and decoupling areas.

Figure 9A:
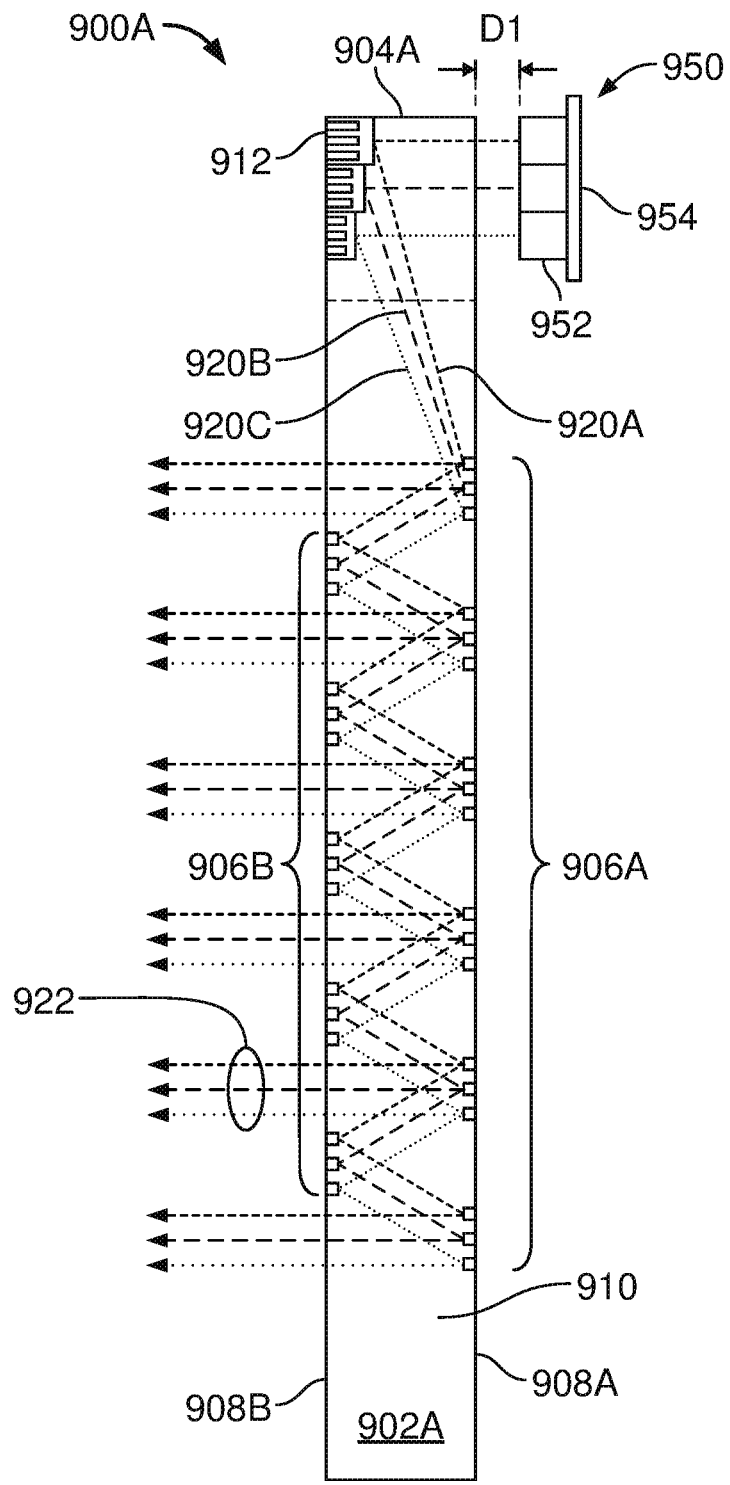
FIGS. 9A-9C depict cross-sectional views of various exemplary input coupling configurations for a waveguide display.
Figure 9B:
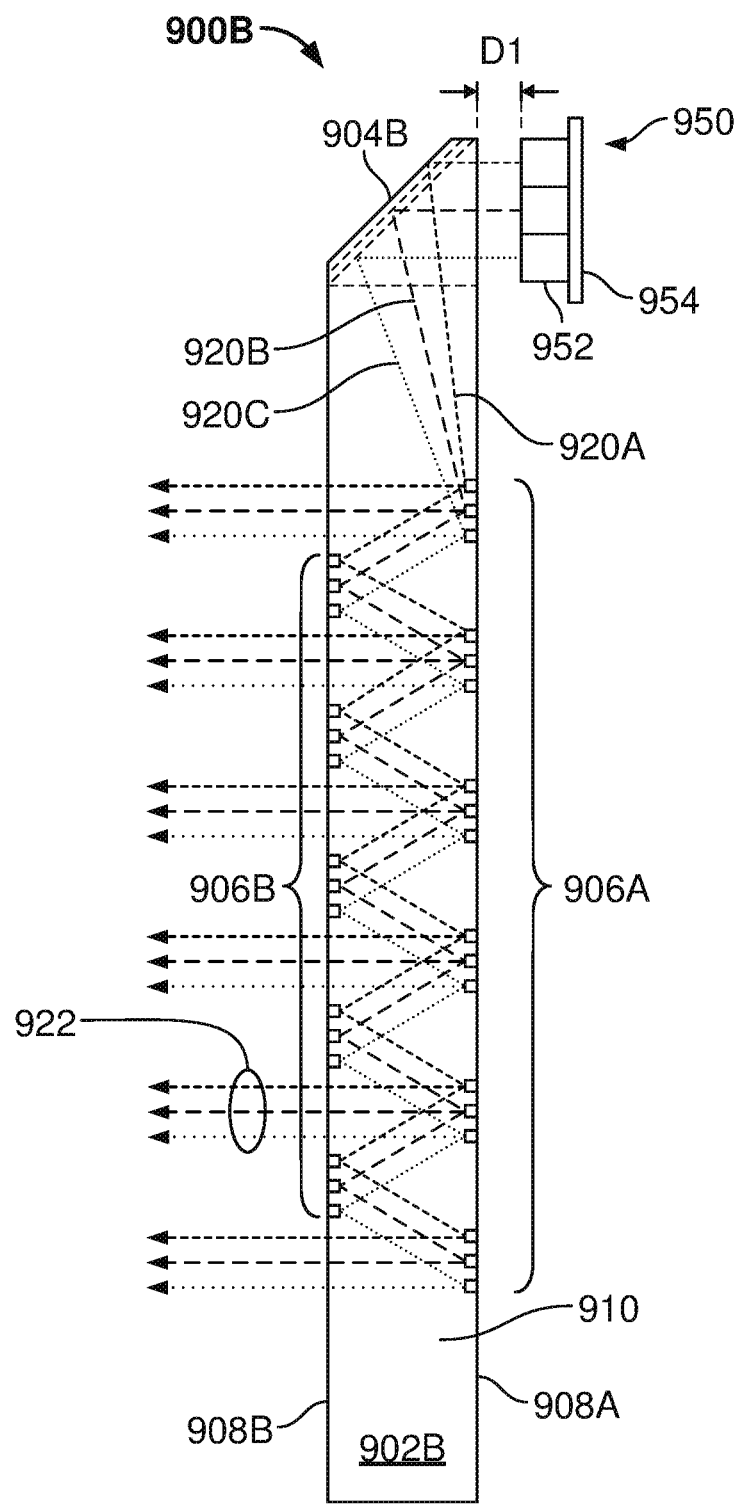
Figure 9C:
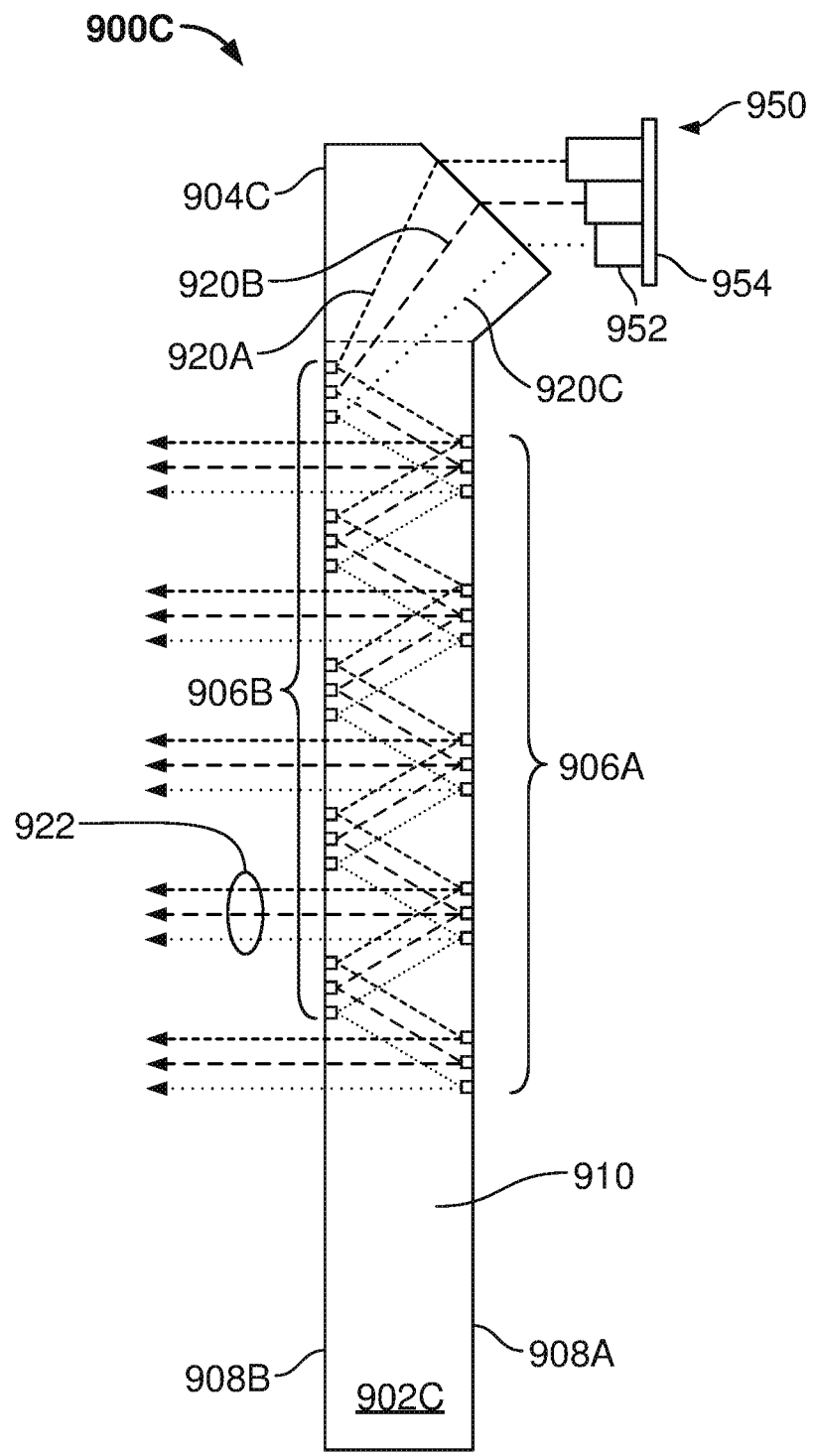

FIGS. 9A, 9B, and 9C are cross-sectional views of display systems or NEDs that include a projector device and a waveguide configuration, according to some embodiments. The embodiments depicted in FIGS. 9A-9C may provide for the projection of many image replications (i.e., pupil replications), while other embodiments may instead provide for decoupling a single image projection at a single point. Accordingly, additional embodiments of disclosed NEDs may provide for a single decoupling element. Outputting a single image toward the eyebox 230 may preserve the intensity of the coupled image light. Some embodiments that provide for decoupling at a single point may further provide for steering of the output image light. Such pupil-steering NEDs may further include systems for eye tracking to monitor a user's gaze. Some embodiments of the waveguide configurations that provide for pupil replication, as described herein, may provide for one-dimensional replication, while other embodiments may provide for two-dimensional replication. As illustrated in FIGS. 9A-9C, two-dimensional pupil replication may include directing light into and outside the plane of each figure. The figures are presented in a simplified format. The detected gaze may be used to adjust the position and/or orientation of the emitter arrays individually or the projector device 950 as a whole and/or to adjust the position and/or orientation of the waveguide configuration. Some exemplary actuation systems for adjusting position and/or orientation of display system components to steer an output image pupil are described in greater detail below with respect to FIGS. 11A-11C.

In FIG. 9A, a waveguide configuration 900A may be disposed in cooperation with a projector device 950, which may include one or more monochromatic emitters 952 secured to a support structure 954 (e.g., a printed circuit board or another structure). Support structure 954 may be coupled to frame 505 of FIG. 5. Waveguide configuration 900A may be separated from projector device 950 by an air gap having a distance D1. The distance D1 may be in a range from approximately 50 μm to approximately 500 μm. The monochromatic image or images projected from projector device 950 may pass through the air gap toward waveguide configuration 900A. Any of the projector device embodiments described herein may be utilized as projector device 950.

Waveguide configuration 900A may include a waveguide 902A, which may be formed from a glass or plastic material. Waveguide 902A may include a coupling area 904A and a decoupling area formed by decoupling elements 906A on a top surface 908A and decoupling elements 906B on a bottom surface 908B. One or more of coupling area 904A, decoupling elements 906A, and decoupling elements 906B may be configured as a variable-pitch diffracting grating whose pitch is switched to correspond to a color being projected by projector device 950. The area within waveguide 902A in between decoupling elements 906A and 906B may be considered a propagation area 910, in which light images received from projector device 950 and coupled into waveguide 902A by coupling elements included in coupling area 904A may propagate laterally within waveguide 902A.

Coupling area 904A may include a coupling element 912 configured to switch to couple light of several predetermined wavelengths, e.g., red, green, or blue light. When a white light emitter array is included in projector device 950, the portion of the white light that falls in the predetermined wavelength may be coupled by each of coupling elements 912. Accordingly, each coupling element 912 may couple a limited portion of the white light from the white light emitter array when included.

As shown in FIG. 9A, a red image 920A, a blue image 920B, and a green image 920C may be coupled by the coupling elements of coupling area 904A into propagation area 910 and may begin traversing laterally within waveguide 902A. A portion of the light may be projected out of waveguide 902A after the light contacts decoupling element 906A for one-dimensional pupil replication, and after the light contacts both decoupling element 906A and decoupling element 906B for two-dimensional pupil replication. In two-dimensional pupil replication embodiments, the light may be projected out of waveguide 902A at locations where the pattern of decoupling element 906A intersects the pattern of the decoupling element 906B.

The portion of light that is not projected out of waveguide 902A by decoupling element 906A may be reflected off decoupling element 906B. Decoupling element 906B may reflect all incident light back toward decoupling element 906A, as depicted. Accordingly, waveguide 902A may sequentially transmit red image 920A, blue image 920B, and green image 920C such that the images are perceived by a user as a single polychromatic image instance, which may be referred to as a pupil replication 922. The polychromatic pupil replication 922 may be projected toward exit pupil location 630 of FIG. 6. Waveguide 902A may produce tens or hundreds of pupil replications 922 or may produce a single replication 922.

FIG. 9B is a cross-sectional view of a waveguide configuration 900B and projector device 950. Waveguide configuration 900B may be similar to waveguide configuration 900A of FIG. 9A in many respects. Waveguide configuration 900B may differ from waveguide configuration 900A in that waveguide 902B may include a different coupling area 904B. Rather than include gratings as coupling elements 912, coupling area 904B of waveguide configuration 900B may include a prism, extending inwardly from bottom surface 908B, that reflects and refracts received image light, directing it toward decoupling element 906A. In this example, decoupling areas 906A and 906B may be configured to compensate for both a chromatic aberration of coupling area 904A and a chromatic aberration of decoupling areas 906A and 906B. Similarly, FIG. 9C is a cross-sectional view of a waveguide configuration 900C and a projector device 950. Waveguide configuration 900C may also include many of the features described herein in connection with waveguide configuration 900A of FIG. 9A. Waveguide configuration 900C may include a waveguide 902C having a coupling area 904C with a prismatic element that protrudes upwardly from top surface 908A.

Figure 10A:
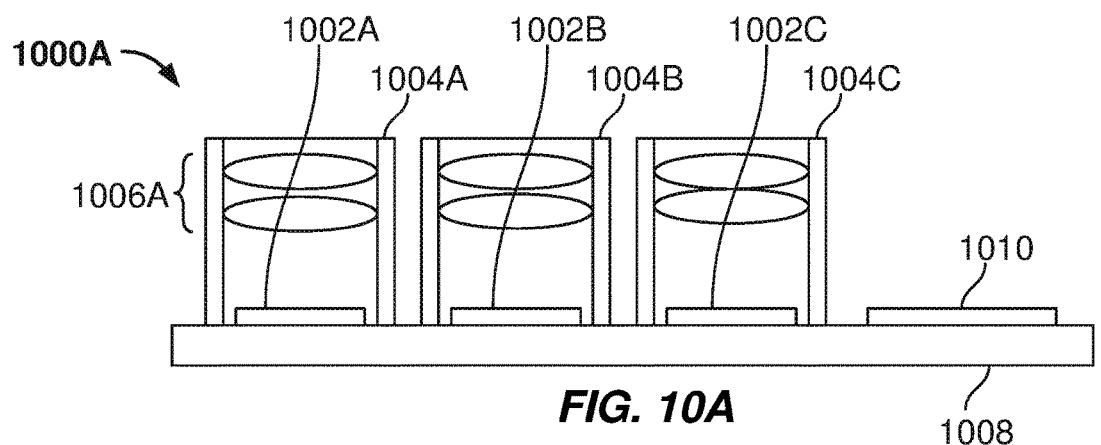
FIGS. 10A-10C depict exemplary emitter assemblies for a multi-monochromatic projector.
Figure 10B:
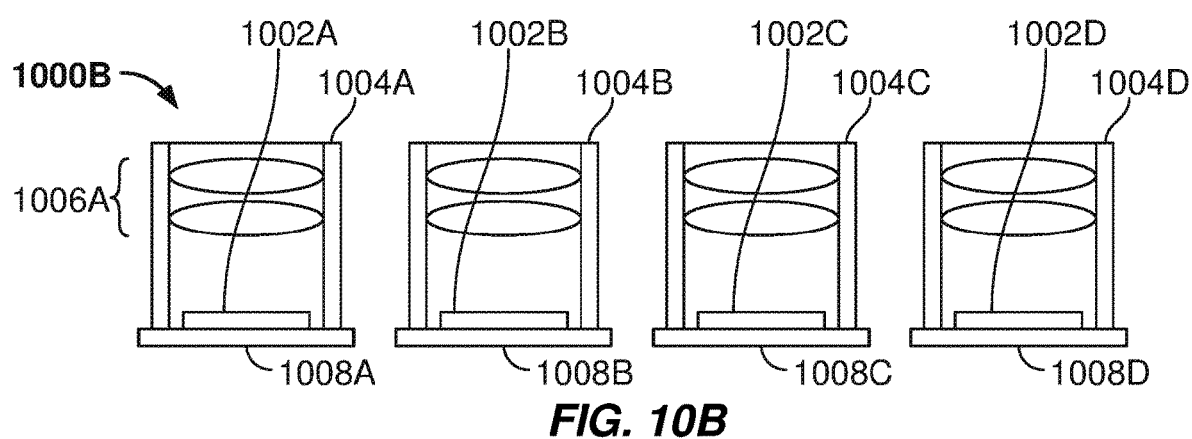
Figure 10C:
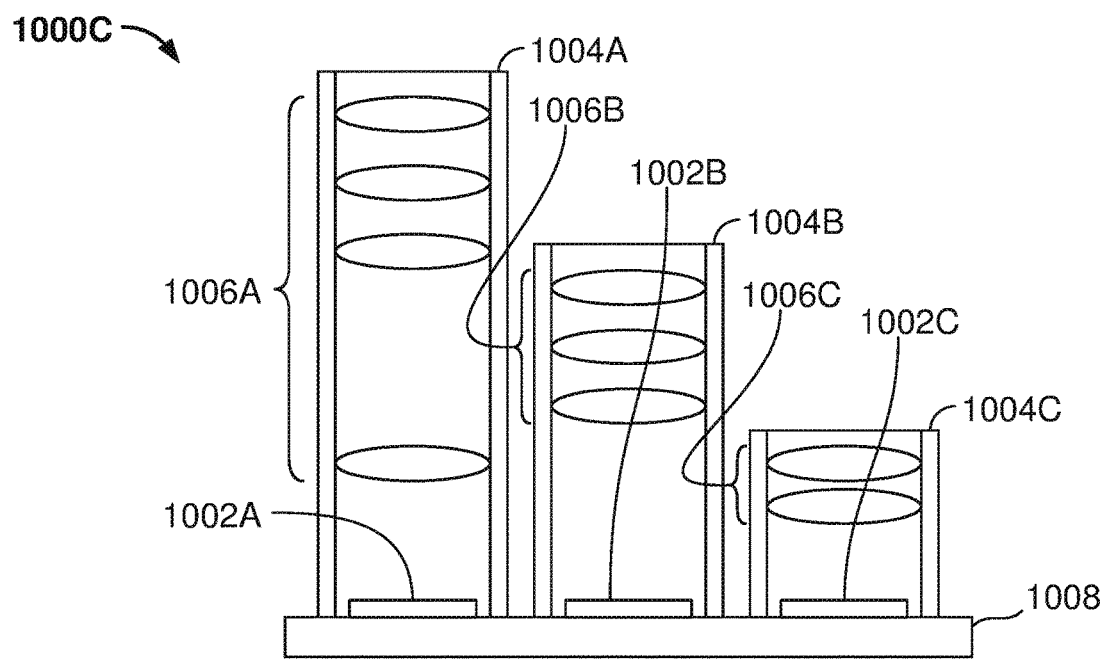

FIGS. 10A, 10B, and 10C are cross-sectional views of projector devices that may be included in NED 700 of FIG. 7 as projector device 710, according to some embodiments. Projector device 1000A of FIG. 10A may include a plurality of two-dimensional monochromatic emitter arrays. As shown, projector device 1000A may include a first emitter array 1002A, a second emitter array 1002B, and a third emitter array 1002C, each of which may be disposed in an array housing 1004A, 1004B, and 1004C, respectively.

Each of housings 1004A-1004C may include an optical system 1006A, which may include one or more optical components, such as lenses, prisms, filters, etc., which may alter the direction or control other characteristics of light emitted by emitter arrays 1002A-1002C. As shown, emitter arrays 1002A-1002C may be secured to a common structure, such as a printed circuit board (PCB) 1008, which may include leads that connect emitter arrays 1002A-1002C to a controller 1010. In other embodiments, controller 1010 may be disposed elsewhere within or on the NED 500, secured either directly or indirectly to frame 505.

Each of the emitter arrays 1002A-1002C may be a monochromatic emitter array having a two-dimensional configuration of individual emitters of a single color. A monochromatic emitter array may emit light within a narrow wavelength range (e.g., 30 nm), rather than at a single wavelength, in some embodiments. According to certain examples, emitter array 1002A may include only red-light emitters, emitter array 1002B may include only green-light emitters, and emitter array 1002C may include only blue-light emitters. Under the direction of controller 1010, each of emitter arrays 1002A-C may sequentially produce a monochromatic image according to the color produced by its emitters. Accordingly, the controller 1010 may direct each of the three monochromatic emitter arrays 1002A-C to switch on and off to sequentially emit three monochromatic images (e.g., a red image, a green image, and a blue image) toward coupling area 750 of FIG. 7. The three-monochromatic images may be extracted from a full-color image. For example, controller 1010 may receive a full-color image to be displayed to a user and then decompose the full-color into multiple monochromatic images, such as a red image, a green image, and a blue image.

FIG. 10B depicts a projector device 1000B in which a plurality of emitter arrays may not be fixed with respect to each other by being secured to a common PCB. Instead, each of the emitter arrays 1002A-1002C may be secured to an individual printed circuit board 1008A, 1008B, 1008C, and 1008D. Projector device 1000B may include a fourth monochromatic emitter array 1002D disposed within a fourth array housing 1004D. In some embodiments, emitter array 1002D may be a white-light emitter array, such that each emitter of emitter array 1002D produces only white light. In some embodiments, the white-light emitter array may be used to produce white image pixels that would otherwise be produced by a combination of the emitter arrays 1002A-C. The white-light emitter array may produce light that is perceived by a viewer as white. In some embodiments, the white-light emitter array may include blue microLEDs with a yellow phosphor coating. The combination of the blue emitters and the phosphor may provide light that appears white to the user. This may reduce power consumption by substituting the power requirements of a single emitter array for a combination of three-emitter arrays. Additionally or alternatively, such a monochromatic image produced by emitter array 1002D may be a brightness or saturation image that does not substantially alter the colors of the polychromatic image produced by combining the three images for emitter arrays 1002A-C.

FIG. 10C depicts a projector device 1000C in which a height of emitter arrays 1002A-1002C may vary from emitter array to emitter array. As shown, array housing 1004A may be higher or taller than array housing 1004B, which in turn may be higher or taller than array housing 1004C. The differences in height may permit differences in the optical system included in each housing. Accordingly, optical system 1006A may have more or larger components or may operate at a higher power level than optical system 1006B, which in turn may have more components and/or a lower power level than the optical system 1006C. For example, emitter array 1002A of FIG. 10C may be a green image emitter array. The larger size of green emitter array 1002A may provide for greater heat dissipation and/or improved optics. This may enable the green image to be the brightest of the three monochromatic images.

Figure 11A:
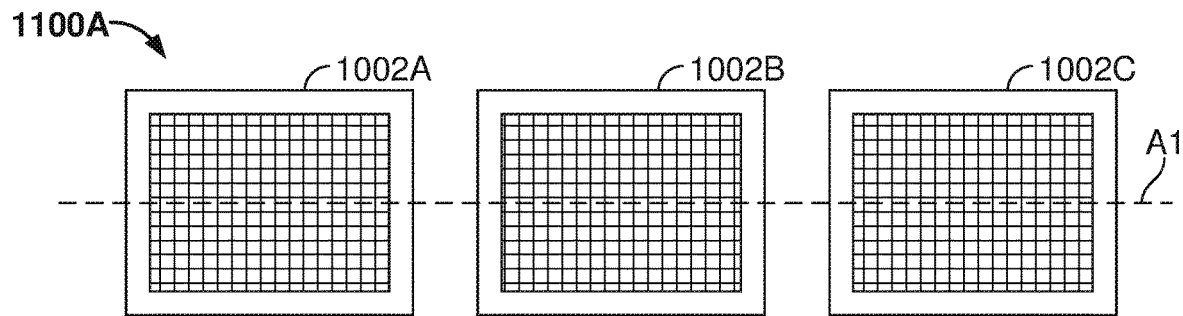
FIGS. 11A-11C depict exemplary emitter configurations for a multi-monochromatic projector.
Figure 11B:
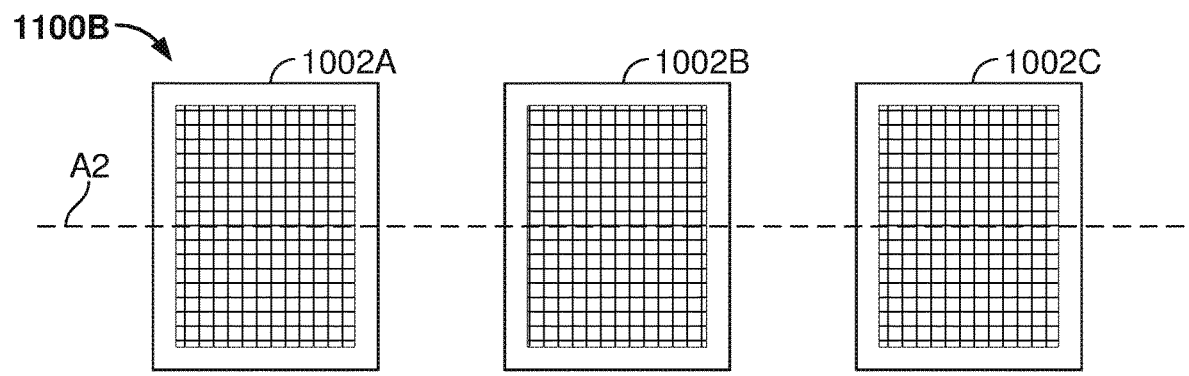
Figure 11C:
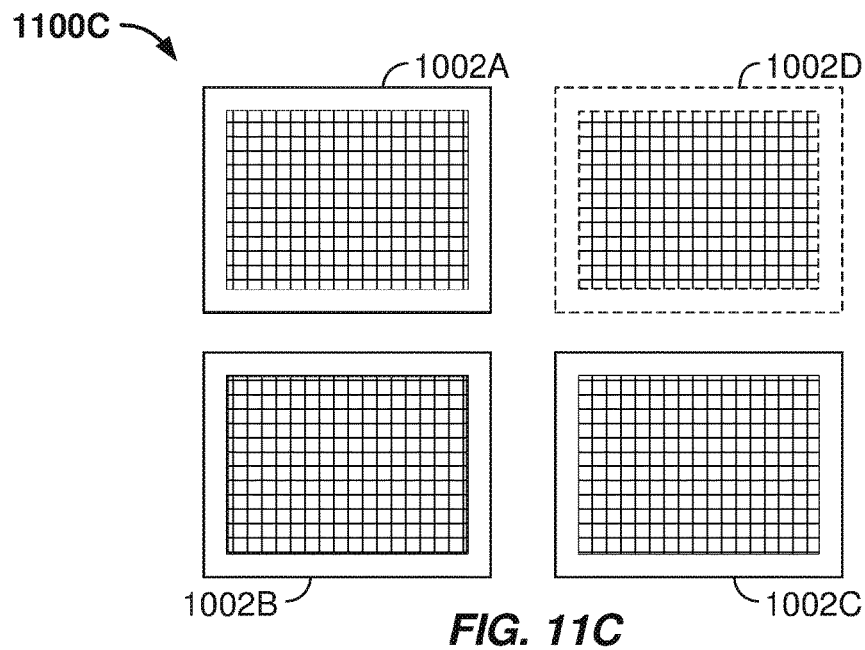

FIGS. 11A, 11B, and 11C are top views of emitter array configurations that may be included in the projector device 710 of FIG. 7, according to some embodiments. The configuration 1100A shown in FIG. 11A is a linear configuration of the emitter arrays 1002A-C of FIG. 10A along the axis A1. This particular linear configuration may be arranged according to a longer side of rectangular emitter arrays 1002. While emitter arrays 1002A-1002C may have a square configuration of emitters in some embodiments, other embodiments may include a rectangular configuration of emitters. In FIG. 5B, emitter arrays 1002A-C may be disposed in a linear configuration 1100B according to a shorter side of the rectangular emitter arrays 1002, along an axis A2. FIG. 11C shows a triangular configuration of emitter arrays 1002A-C in which the centers of emitter arrays 1002A-1002C form a triangular shape. Some embodiments of configuration 1100C of FIG. 11C may further include a white-light emitter array 1002D, such that the emitter arrays 1002A-1002C are in a rectangular or square configuration. Emitter arrays 1002A-1002C may have a two-dimensional emitter configuration with more than 1000 by 1000 emitters, in some embodiments. Various other configurations are also within the scope of the present disclosure.

FIGS. 12A and 12B are schematic cross-sectional diagrams of a microLED 1200A that may be included as an individual emitter in emitters arrays 1002A-1002C of FIGS. 10A-C and 11A-C, according to some embodiments. FIG. 12A shows a schematic cross-section of a microLED 1200A. A microLED may be a particular type of LED having a small active light emitting area (e.g., less than 2,000 $\mu m^2$ in some embodiments, less than 20 $\mu m^2$ or less than 10 $\mu m^2$ in other embodiments). In some embodiments, the emissive surface of microLED 600A may have a diameter of less than approximately 2 $\mu m$. MicroLED 600A may also have collimated light output, which may increase the brightness level of light emitted from the small active light emitting area.

MicroLED 1200A may include, among other components, an LED substrate 1202 with a semiconductor epitaxial layer 1204 disposed on substrate 1202, a dielectric layer 1214 disposed on epitaxial layer 1204, a p-contact 1216 disposed on dielectric layer 1214, and an n-contact 1218 disposed on epitaxial layer 1204. Epitaxial layer 1204 may be shaped into a mesa 1206. An active (or light emitting) layer 1208 (or "active light emitting area") may be included in the structure of mesa 1206.

Substrate 1202 may include transparent materials such as a sapphire or glass. In one embodiment, substrate 1202 may include silicon, silicon oxide, silicon dioxide, aluminum oxide, sapphire, an alloy of silicon and germanium, and/or indium phosphide (InP), and the like. In some embodiments, substrate 1202 may include a semiconductor material (e.g., monocrystalline silicon, germanium, silicon germanium, SiGe, and/or a III-V based material (e.g., gallium arsenide), or any combination thereof. In various embodiments, substrate 1202 can include a polymer-based substrate, glass, or any other bendable substrate including two-dimensional materials (e.g., graphene and molybdenum disulfide), organic materials (e.g., pentacene), transparent oxides (e.g., indium gallium zinc oxide (IGZO)), polycrystalline III-V materials, polycrystalline germanium, polycrystalline silicon, amorphous III-V materials, amorphous germanium, amorphous silicon, or any combination thereof.

Epitaxial layer 1204 may include gallium nitride (GaN) or Gallium arsenide (GaAs). Active layer 1208 may include indium gallium nitride (InGaN). The type and structure of semiconductor material used may vary to produce microLEDs that emit specific colors. In one embodiment, the semiconductor materials used can include a III-V semiconductor material. III-V semiconductor material layers can include those materials that are formed by combining group III elements (Al, Ga, In, etc.) with group V elements (N, P, As, Sb, etc.). P-contact 1216 and n-contact 1218 may be contact layers formed from indium tin oxide (ITO) or another conductive material that can be transparent at the desired thickness, which may result in microLED 1200A also being transparent or substantially transparent.

Mesa 1206 of epitaxial layer 1204 may have a truncated top on a side opposed to a substrate light emissive surface 1210 of substrate 1202. Mesa 1206 may also have a parabolic or near-parabolic shape to form a reflective enclosure or parabolic reflector for light generated within microLED 1200A. The arrows indicate how light 1212 emitted from active layer 1208 may be reflected off the internal walls of mesa 1206 toward light emissive surface 1210 at an angle sufficient for the light to escape microLED 1200A (i.e., within an angle of total internal reflection). P-contact 1216 and n-contact 1218 may electrically connect microLED 1200A to a substrate.

The parabolic-shaped structure of microLED 1200A may result in an increase in the extraction efficiency of microLED 1200A into low illumination angles when compared to unshaped or standard LEDs. Standard LED dies may generally provide an emission full width half maximum (FWHM) angle of 120°. In comparison, microLED 1200A can be designed to provide controlled emission angle FWHM of less than standard LED dies, such as around 60°. This increased efficiency and collimated output of microLED 1200A can produce light visible to the human eye with nano-amps of drive current, producing little heat, and permitting small microLEDs.

MicroLED 1200A may include a circular cross-section when cut along a horizontal plane as shown in FIG. 12A. MicroLED 1200A may have a parabolic structure etched directly onto the LED die during the wafer processing steps. The parabolic structure may include a light emitting region of microLED 1200A to generate light, and the parabolic structure may reflect a portion of the generated light to form quasi-collimated light 1212 emitted from the substrate light emissive surface 1210.

FIG. 12B depicts a microLED 1200B that is similar in many respects to microLED 1200A of FIG. 12A. MicroLED 1200B may further include a microlens 1220, which may be formed over the parabolic structure. In some embodiments, microlens 1220 may be formed by applying a polymer coating over microLED 1200A, patterning the coating, and reflowing the coating to achieve the desired lens curvature. Microlens 1220 may be disposed over an emissive surface to alter a chief ray angle of microLED 1200B. In another embodiment, microlens 1220 may be formed by depositing a microlens material above microLED 1200A (for example, by a spin-on method or a deposition process). For example, a microlens template (not shown) having a curved upper surface can be patterned above the microlens material. In some embodiments, the microlens template may include a photoresist material exposed using a distributing exposing light dose (e.g., for a negative photoresist, more light is exposed at a bottom of the curvature and less light is exposed at a top of the curvature), developed, and baked to form a rounding shape. Microlens 1220 can then be formed by selectively etching the microlens material according to the microlens template.

FIGS. 13A and 13B are perspective views of display systems or NEDs, according to some embodiments. NED 1300A in FIG. 13A may include an elongate waveguide configuration 1302 that may be wide or long enough to project images to both eyes of a user. Waveguide configuration 1302 may include a decoupling area 1304, which may be a variable-phase diffraction grating. To provide images to both eyes of the user through waveguide configuration 1302, multiple coupling areas 1306A and 1306B may be provided in a top surface of waveguide configuration 1302. Coupling areas 1306A and 1306B may include multiple coupling elements to interface with light images provided by an emitter array set 1308A and an emitter array set 1308B. Each of emitter array sets 1308A and 1308B may include a plurality of monochromatic emitter arrays, as described herein. As shown, emitter array sets 1308A and 1308B may each include a red emitter array, a green emitter array, and a blue emitter array configured to be activated sequentially. As described herein, some emitter array sets may further include a white emitter array.

In some implementations of waveguide configuration 1302, emitter array sets 1308A and 1308B may cover approximately identical portions of decoupling area 1304, as shown by the divider line 1310A. In other embodiments, emitter array sets 1308A and 1308B may provide images into the waveguide of the waveguide configuration 1302 asymmetrically, as shown by divider line 1310B. In such an implementation, emitter array set 1308A may provide images to more than half of the decoupling area 1304, while emitter array set 1308B may provide images to less than half of decoupling area 1304. While emitter array sets 1308A and 1308B may be disposed at opposite sides of the waveguide configuration 1302 as shown in FIG. 13A, other embodiments may include emitter array sets 1308A and 1308B arranged at angles other than 180° apart. While the waveguide configuration 1302 may be planar in some embodiments, it may also have a curved cross-sectional shape in other embodiments to better conform to the face/head of a user.

FIG. 13B is a perspective view of an NED 1300B that has a waveguide configuration with a right eye waveguide 1320A and a left eye waveguide 1320B with decoupling areas 1322A and 1322B, respectively. Right eye waveguide 1320A may include one or more coupling areas 1324A and 1324B and a corresponding number of emitter array sets 1326A and 1326B. Accordingly, while the depicted embodiment of right eye waveguide 1320A may include two coupling areas 1324A and 1324B and two emitter array sets 1326A and 1326B, other embodiments may include more or fewer. In some embodiments, the individual emitter arrays of an emitter array set may be disposed at different locations around a decoupling area. For example, the emitter array set 1326A may include a red emitter array disposed along a left side of decoupling area 1322A, a green emitter array disposed along the top side of decoupling area 1322A, and a blue emitter array disposed along the right side of coupling area 1322A. Accordingly, emitter arrays of an emitter array set may be disposed all together, in pairs, or individually, relative to a decoupling area.

Left eye waveguide 1320B may include the same number and configuration of coupling areas (e.g., 1324C and 1324D) and emitter array sets (e.g., 1326C and 1326D) as right eye waveguide 1320A, in some embodiments. In other embodiments, left eye waveguide 1320B and right eye waveguide 1320A may include different numbers and configurations (e.g., positions and orientations) of coupling areas 1324 and emitter array sets 1326. Included in the depiction of the right eye waveguide 1320A is a depiction of the effective pupil replication areas of the individual emitter arrays included in one emitter array set 1326. For example, a red emitter array of the emitter array set 1326 may produce pupil replications of a red image within limited area 1328A. A green emitter array may produce pupil replications of a green image within limited area 1328B. A blue emitter array may produce pupil replications of a blue image within the limited area 1328C. Because limited areas 1328 may be different from one monochromatic emitter array to another, only the overlapping portions of limited areas 1328 may be able to provide full-color pupil replication, projected toward eyebox 1330.

Embodiments of the instant disclosure may also provide a number of other features and advantages over traditional systems. For example, embodiments of the instant disclosure may provide non-mechanical switching of diffraction grating pitches, which may be more efficient (e.g., may have lower driving voltages) and effective that some traditional systems. The ability to have a single grating where the pitch can change would reduce the number of waveguides necessary reducing system size, weight, and complexity.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a projector that switches from emitting monochromatic light of a first color to emitting monochromatic light of a second color that is different from the first color;
   a set of variable-pitch diffraction grating comprising one or more variable-pitch diffraction gratings that diffract monochromatic light emitted from the projector; and
   a controller that changes a pitch of each grating in the set of variable-pitch diffraction gratings from:
      a first pitch used when the projector is emitting monochromatic light of the first color; to
      a second pitch used when the projector is emitting monochromatic light of the second color.

2. The apparatus of claim 1, wherein:
   the set of variable-pitch diffraction gratings comprises:
      a coupling diffraction grating that receives monochromatic light from the projector; and
      a decoupling diffraction grating that receives diffracted light from the coupling diffraction grating, and
   the controller changes pitches of the coupling and decoupling diffraction gratings in tandem.

3. The apparatus of claim 1, wherein the controller changes the pitch by changing an electric field applied to each grating in the set of variable-pitch diffraction gratings.

4. The apparatus of claim 3, wherein:
   before being changed, the electric field causes liquid crystal molecules in each grating in the set of variable-pitch diffraction gratings to align in a configuration comprising a first periodic refractive index profile; and
   after being changed, the electric field causes the liquid crystal molecules in each grating in the set of variable-pitch diffraction gratings to align in a configuration comprising a second periodic refractive index profile.

5. The apparatus of claim 3, wherein:
   before being changed, the electric field is generated by applying an electric voltage to a first pattern of electrodes in each grating in the set of variable-pitch diffraction gratings;
   after being changed, the electric field is generated by applying an electric voltage to a second pattern of electrodes in each grating in the set of variable-pitch diffraction gratings; and
   the second pattern is different from the first pattern.

6. The apparatus of claim 1, wherein:
   the projector further switches from emitting monochromatic light of the second color to emitting monochromatic light of a third color that is different from the first color and the second color; and
   the controller changes the pitch of each grating in the set of variable-pitch diffraction gratings from:
      the second pitch used when the projector is emitting the monochromatic light of the second color; to
      a third pitch used when the projector is emitting the monochromatic light of the third color.

7. The apparatus of claim 1, wherein the set of variable-pitch diffraction gratings comprise a set of nematic-type liquid crystal diffraction gratings with chiral dopants.

8. The apparatus of claim 1, wherein the projector is controlled to delay emitting monochromatic light of the second color until the pitch of each grating in the set of variable-pitch diffraction gratings has been changed to the second pitch.

9. The apparatus of claim 1, further comprising a waveguide, wherein:
   the projector emits monochromatic images into the waveguide;

the projector switches between emitting monochromatic images of the first color, emitting monochromatic images of the second color, and emitting monochromatic images of a third color that is different from the first and second colors;

the waveguide comprises the set of variable-pitch diffraction gratings that diffract the monochromatic light emitted from the projector;

the controller changes a pitch of each grating in the set of variable-pitch diffraction gratings from:
 the first pitch used when the projector is emitting monochromatic light of the first color; to
 the second pitch used when the projector is emitting monochromatic light of the second color; to
 a third pitch used when the projector is emitting monochromatic light of the third color; and at least one of the first, second, and third colors comprises red;

at least one of the first, second, and third colors comprises green, and at least one of the first, second, and third colors comprises blue.

10. The apparatus of claim 9, further comprising a head-worn frame, wherein:
 the waveguide is attached to the head-worn frame such that, when the head-worn frame is donned by a user, the waveguide is viewable by the user; and
 a decoupling grating in the set of variable-pitch diffraction gratings emits the monochromatic light of the first, second, and third colors in sequence to generate at least one polychromatic pupil replication that at least partially defines a viewing eyebox.

11. A method comprising:
 directing a projector to switch from emitting monochromatic light of a first color to emitting monochromatic light of a second color that is different from the first color; and
 controlling a change in a pitch of each grating in a set of variable-pitch diffraction gratings that diffract the monochromatic light emitted from the projector from:
  a first pitch used when the projector is emitting the monochromatic light of the first color; to
  a second pitch used when the projector is emitting the monochromatic light of the second color.

12. The method of claim 11, wherein:
 the set of variable-pitch diffraction gratings comprises two variable-pitch diffraction gratings sharing the same pitch, and
 the pitch of the two variable-pitch diffraction gratings sharing the same pitch is changed in tandem.

13. The method of claim 11, wherein the pitch is changed by changing an electric field applied to each grating in the set of variable-pitch diffraction gratings.

14. The method of claim 13, wherein:
 before being changed, the electric field causes liquid crystal molecules each grating in the set of variable-pitch diffraction gratings to align in a configuration comprising a first periodic refractive index profile, and
 after being changed, the electric field causes the liquid crystal molecules each grating in the set of variable-pitch diffraction gratings to align in a configuration comprising a second periodic refractive index profile.

15. The method of claim 11, wherein the projector is controlled to emit monochromatic light of the second color after the pitch has been changed from the first pitch to the second pitch.

16. The method of claim 11, further comprising:
 directing the projector to switch from emitting monochromatic light of the second color to emitting monochromatic light of a third color that is different from the first color and the second color; and
 controlling an additional change in the pitch of each grating in the set of variable-pitch diffraction gratings from:
  the second pitch used when the projector is emitting the monochromatic light of the second color; to
  a third pitch used when the projector is emitting the monochromatic light of the third color.

17. The method of claim 11, wherein the set of variable-pitch diffraction gratings comprises a set of liquid crystal gratings comprising chiral dopants.

18. A computer-readable medium storing computer-readable instructions that, when executed by at least one processor of a computing device, cause the computing device to:
 direct a projector to switch from emitting monochromatic light of a first color to emitting monochromatic light of a second color that is different from the first color; and
 control a change in a pitch of each grating in a set of variable-pitch diffraction gratings that diffract the monochromatic light emitted from the projector from:
  a first pitch used when the projector is emitting the monochromatic light of the first color; to
  a second pitch used when the projector is emitting the monochromatic light of the second color.

19. The computer-readable medium of claim 18, wherein:
 the set of variable-pitch diffraction gratings comprises two variable-pitch diffraction gratings sharing the same pitch, and
 the pitches of the two variable-pitch diffraction gratings that share the same pitch are changed in tandem.

20. The computer-readable medium of claim 18, wherein the computer-readable instructions are programmed to control the change in the pitch by changing an electric field applied to each grating in the set of variable-pitch diffraction gratings.

* * * * *